(12) United States Patent
Chan et al.

(10) Patent No.: US 9,035,934 B2
(45) Date of Patent: May 19, 2015

(54) VOLTAGE BIASED PULL ANALOG INTERFEROMETRIC MODULATOR WITH CHARGE INJECTION CONTROL

(75) Inventors: Edward K. Chan, San Diego, CA (US);
John H. Hong, San Clemente, CA (US);
Cheonhong Kim, San Diego, CA (US);
Chong U. Lee, San Diego, CA (US);
Bing Wen, San Diego, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 456 days.

(21) Appl. No.: 13/462,696

(22) Filed: May 2, 2012

(65) Prior Publication Data
US 2013/0293523 A1   Nov. 7, 2013

(51) Int. Cl.
*G06F 3/038* (2013.01)
*G09G 5/00* (2006.01)
*G02B 26/00* (2006.01)
*G09G 3/36* (2006.01)
*G09G 3/34* (2006.01)

(52) U.S. Cl.
CPC ......... *G02B 26/001* (2013.01); *Y10T 29/49117* (2015.01); *G09G 3/3696* (2013.01); *G09G 3/3466* (2013.01); *G09G 2310/0248* (2013.01); *G09G 2310/0259* (2013.01); *G09G 2310/0272* (2013.01); *G09G 2320/0295* (2013.01)

(58) Field of Classification Search
CPC .................................................... G09G 3/3466
USPC .......................................... 345/204, 211, 212
See application file for complete search history.

(56) References Cited

U.S. PATENT DOCUMENTS

| | | | |
|---|---|---|---|
| 6,040,937 A | 3/2000 | Miles | |
| 6,674,562 B1 | 1/2004 | Miles | |
| 7,072,093 B2 | 7/2006 | Piehl et al. | |
| 7,123,216 B1 | 10/2006 | Miles | |
| 7,161,518 B1 | 1/2007 | Webb et al. | |
| 7,327,510 B2 | 2/2008 | Cummings et al. | |
| 7,729,036 B2 * | 6/2010 | Felnhofer et al. | ............. 359/290 |
| 7,733,553 B2 | 6/2010 | Faase et al. | |
| 7,733,557 B2 | 6/2010 | Handschy et al. | |

(Continued)

FOREIGN PATENT DOCUMENTS

CN      101855587 A   *  10/2010

OTHER PUBLICATIONS

Seeger et al., Jun. 7-9, 1999, Dynamics and control of parallel-plate actuators beyond the electrostatic instability, Transducers '99, The 10th International Conference on Solid-State Sensors and Actuators, Sendai, Japan, pp. 474-477.

(Continued)

*Primary Examiner* — Mark Regn
(74) *Attorney, Agent, or Firm* — Knobbe Martens Olson & Bear LLP

(57) ABSTRACT

This disclosure provides systems, methods and apparatus for driving three-terminal electromechanical systems (EMS) devices. The driving systems and methods described herein include a switched capacitor charge injection circuit that is configured to isolate a single EMS device and transfer a desired amount of charge to the isolated device such that the device can be actuated to produce a desired optical, electrical or mechanical effect. The charge injection circuit can include an operational amplifier and can be connected such that the EMS device is placed in the feedback path of the operational amplifier.

30 Claims, 28 Drawing Sheets

(56) References Cited

U.S. PATENT DOCUMENTS

| | | | |
|---|---|---|---|
| 7,999,995 B2 | 8/2011 | Hashimura et al. | |
| 2007/0013613 A1 | 1/2007 | Umezaki | |
| 2008/0174532 A1* | 7/2008 | Lewis | 345/85 |
| 2009/0289606 A1 | 11/2009 | Lauxtermann et al. | |
| 2010/0315696 A1* | 12/2010 | Lee et al. | 359/290 |
| 2012/0044237 A1* | 2/2012 | Hong et al. | 345/212 |
| 2012/0044562 A1* | 2/2012 | Hong et al. | 359/290 |

OTHER PUBLICATIONS

International Search Report and Written Opinion—PCT/US2013/037394—ISA/EPO—Aug. 19, 2014.
Partial International Search Report—PCT/US2013/037394—ISA/EPO—Jun. 11, 2014.
Taiwan Search Report—TW102115260—TIPO—Sep. 22, 2014.

* cited by examiner

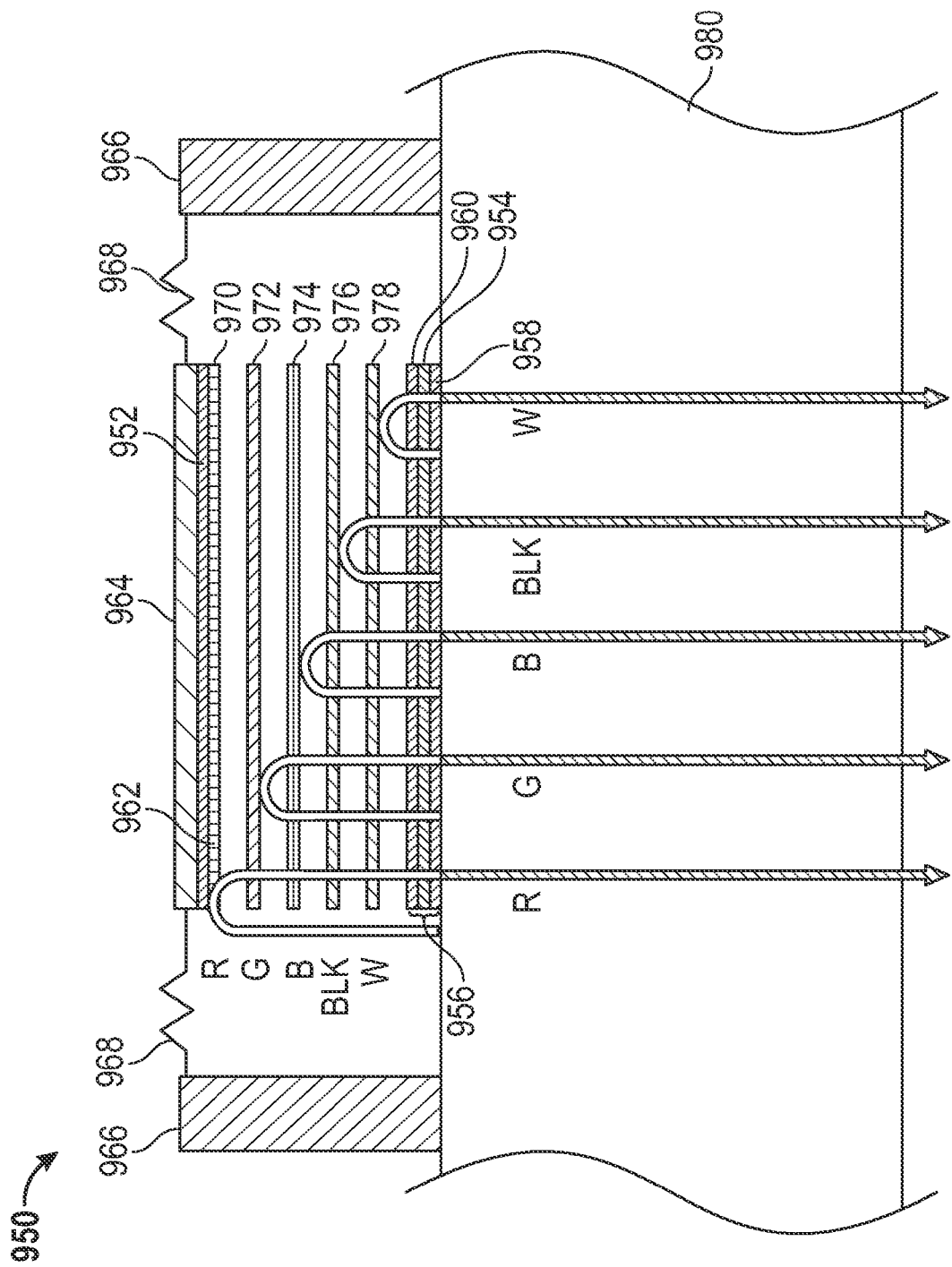

US 9,035,934 B2

VOLTAGE BIASED PULL ANALOG INTERFEROMETRIC MODULATOR WITH CHARGE INJECTION CONTROL

TECHNICAL FIELD

This disclosure relates to systems and methods for actuating electromechanical systems (EMS). More particularly, this disclosure relates to systems and methods that provide charge to EMS devices which use the charge to move an optical element from one position to another.

DESCRIPTION OF THE RELATED TECHNOLOGY

EMS include devices having electrical and mechanical elements, actuators, transducers, sensors, optical components (for example, mirrors) and electronics. EMS can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One or more components of the EMS devices can be driven or actuated for various applications (for example, electrical switching, light modulation, etc.), and systems and methods of driving EMS devices including voltage controlled actuation have been developed. Because movement of movable reflectors in certain EMS can depend on an electrostatic attraction, precisely providing (or injecting) a desired charge can result in better control of the EMS device.

One type of electromechanical systems device is called an interferometric modulator (IMOD). As used herein, the term IMOD or interferometric light modulator refers to a device that selectively absorbs and/or reflects light using the principles of optical interference. In some implementations, an IMOD may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a reflective membrane separated from the stationary layer by an air gap. The position of one plate in relation to another can change the optical interference of light incident on the IMOD. IMOD devices have a wide range of applications, and are anticipated to be used in improving existing products and creating new products, especially those with display capabilities.

SUMMARY

The systems, methods and devices of the disclosure each have several innovative aspects, no single one of which is solely responsible for the desirable attributes disclosed herein.

One innovative aspect of the subject matter described in this disclosure can be implemented in an apparatus, including an array of three terminal electromechanical systems (EMS) devices arranged in a plurality of rows and columns. Each EMS device includes a first stationary electrode layer connected to a first drive line; a movable electrode layer connected to a second drive line and a second stationary electrode layer connected to a third drive line. The movable electrode layer is disposed between the first and the second stationary electrode layers. A portion of the movable electrode layer and the first stationary electrode layer form a first variable capacitor having a first variable capacitance value. A portion of the movable electrode layer and the second stationary electrode layer form a second variable capacitor having a second variable capacitance value. The apparatus further includes a bias voltage circuit having a bias voltage line connected to the third drive line of each of the EMS devices in a column of the array. The bias voltage circuit is configured to provide a potential difference between the second stationary electrode layer and the movable electrode layer. The apparatus also includes a charge injection circuit configured to electrically connect to the first drive line and the second drive line of each of the EMS devices in the column of the array such that the charge injection circuit is electrically connected to the first and second drive line of only one of the EMS devices at any one time to provide a desired charge to the first stationary electrode layer. The charge injection circuit includes an operational amplifier having an inverting input line, a non-inverting input line and an output line. The inverting input line of the operational amplifier is electrically connected to the second drive line of each of the EMS devices in the column. The charge injection circuit includes a plurality of row-select switches controlled to selectively electrically connect the output line of the operational amplifier to the first drive line of each of the EMS devices in the column such that the output line of the operational amplifier is electrically connected to the first drive line of only one EMS device at any one time. The charge injection circuit further includes an input capacitor circuit configured to be electrically connected to the inverting line of the operational amplifier or to a voltage circuit for charging the input capacitor circuit to a charge $Q_{in}$. The charge injection circuit is controlled to selectively connect the first drive line of each EMS device in the column, for each of the display elements in the column, to the output line of the operational amplifier while a charge from the input capacitor circuit is transferred to the first drive line of the EMS device electrically connected to the charge injection circuit.

In various implementations, the apparatus described above can further include an operational amplifier grounding switch coupled between the operational amplifier output line and the operational amplifier inverting line. In various implementations, the movable electrode layer of each EMS device can include a first conductor proximal to the first stationary electrode layer and a second conductor proximal to the second stationary electrode layer. The first conductor can be connected to the second drive line. In various implementations, the first conductor can be electrically insulated from the second conductor. In such implementations, the first conductor and the first stationary electrode layer can form the first variable capacitor while the second conductor and the second stationary electrode layer can form the second variable capacitor. In various implementations, the apparatus can include a movable electrode reset switch configured to connect the second conductor of the movable electrode layer of each EMS devices to an electrical ground.

Various implementations of the apparatus described above can include a storage capacitor having a storage capacitance value. The storage capacitor can be electrically connected between the first stationary electrode layer and the first conductor of the movable electrode layer of each of the EMS devices. In various implementations, the storage capacitance can have a value that is greater than a smallest value of the first variable capacitance. In various implementations, the storage capacitance can have a value that is greater than a maximum variation of the first variable capacitance value. Various implementations of the apparatus described above can include a bypass capacitor having a bypass capacitance value. The bypass capacitor can be electrically connected between the inverting line of the operational amplifier and the bias voltage line of the bias voltage circuit. In various implementations, the bypass capacitance value can be greater than a sum of the second variable capacitance values for all the electromechanical systems devices in the column. In various implementations, the bypass capacitor can be connected to a charging voltage source through a charging switch. Various implementations of the apparatus described above can include a clamping diode that can be electrically connected between the inverting line and the non-inverting line of the operational amplifier. Various implementations of the charge injection circuit can be configured to transfer about 10 picocoulombs of charge in about 10 microseconds. In various implementations, each of the EMS devices can be a display pixel or a portion of a display pixel. In various implementations, each of the EMS devices can include an IMOD.

Another innovative aspect of the subject matter described in this disclosure can be implemented in a method of calibrating a three-terminal EMS device. In various implementations the EMS device can include the apparatus described above. The method includes providing a first amount of known charge to the EMS device, determining a first calculated voltage value for voltage developed across the first stationary electrode and the movable electrode in response to the provided first amount of known charge, measuring a first voltage value across the first stationary electrode and the movable electrode in response to the provided first amount of known charge and comparing the first calculated voltage value with the measured first voltage value to obtain a first difference value. The calibration method further includes providing a second amount of known charge to the EMS device, determining a second calculated voltage value for voltage developed across the first stationary electrode and the movable electrode in response to the provided second amount of known charge, measuring a second voltage value across the first stationary electrode and the movable electrode in response to the provided second amount of known charge, and comparing the second calculated voltage value with the measured second voltage value to obtain a second difference value. The method further includes determining calibration information of at least one of a stiffness constant of the movable electrode and a launch bias of the movable electrode based on the first and second difference values and storing the calibration information in the memory of the apparatus.

Another innovative aspect of the subject matter described in this disclosure can be implemented in an apparatus, including an array of three terminal EMS devices arranged in a plurality of rows and columns. Each EMS device including a first stationary means for conducting electricity connected to a first drive line, a movable means for conducting electricity connected to a second drive line and a second stationary means for conducting electricity connected to a third drive line. The movable conducting means can be disposed between the first and the second stationary conducting means. A portion of the movable conducting means and the first stationary conducting means can form a first variable capacitor having a first variable capacitance value and a portion of the movable conducting means and the second stationary conducting means form a second variable capacitor having a second variable capacitance value. The apparatus further includes a bias voltage circuit having a bias voltage line connected to the third drive line of each of the EMS devices in a column of the array. The bias voltage circuit is configured to provide a potential difference between the second stationary conducting means and the movable conducting means. The apparatus further includes a means for injecting electrical charge that is configured to be electrically connected to the first drive line and the second drive line of each of the EMS devices in the column of the array such that the charge injecting means is electrically connected to the first and second drive line of only one of the EMS devices at any one time to provide a desired charge to the first stationary conducting means. The charge injecting means includes an operational amplifier having an inverting input line, a non-inverting input line, and an output line. The inverting input line of the operational amplifier is electrically connected to the second drive line of each of the EMS devices in the column. The charge injecting means further includes a plurality of means for selectively electrically connecting the output line of the operational amplifier to the first drive line of each of the EMS devices in the column such that the output line of the operational amplifier is electrically connected to the first drive line of only one EMS device at any one time. The charge injecting means further includes an input capacitor circuit configured to be electrically connected to the inverting line of the operation amplifier or to a voltage circuit for charging the input capacitor circuit to a charge $Q_{in}$. The charge injecting means is controlled to selectively connect the first drive line of each EMS device in the column, for each of the display elements in the column, to the output line of the operational amplifier while a charge from the input capacitor circuit is transferred to the first drive line of the EMS device electrically connected to the charge injecting means.

In various implementations of the apparatus described above, the first stationary conducting means can include a first stationary electrode layer. In various implementations of the apparatus described above, the second stationary conducting means can include a second stationary electrode layer. In various implementations of the apparatus described above, the movable conducting means can include a movable electrode layer. In various implementations of the apparatus described above, the charge injecting means can include a charge injection circuit. In various implementations of the apparatus described above, the selectively electrically connecting means includes a row-select switch.

Another innovative aspect of the subject matter described in this disclosure can be implemented in a method of manufacturing an EMS device, the method includes providing an array of three terminal electromechanical systems devices arranged in a plurality of rows and columns. Each EMS device includes a first stationary electrode layer connected to a first drive line, a movable electrode layer connected to a second drive line and a second stationary electrode layer connected to a third drive line, the movable electrode layer disposed between the first and the second stationary electrode layers. A portion of the movable electrode layer and the first stationary electrode layer form a first variable capacitor having a first variable capacitance value and a portion of the movable electrode layer and the second stationary electrode layer form a second variable capacitor having a second variable capacitance value. The method further includes connecting a bias voltage circuit having a bias voltage line connected to the third drive line of each of the EMS devices in a column of the array. The bias voltage circuit is configured to provide a potential difference between the second stationary electrode layer and the movable electrode layer. The method further includes selectively coupling a charge injection circuit to the first drive line and the second drive line of only one of the EMS devices in the column of the array at any one time to provide a desired charge to the first stationary electrode layer. The charge injection circuit includes an operational amplifier having an inverting input line, a non-inverting input line, and an output line. The inverting input line of the operational amplifier is electrically connected to the second drive line of each of the EMS devices in the column. The charge injection circuit includes a plurality of row-select switches controlled to selectively electrically connect the output line of the operational amplifier to the first drive line of each of the EMS devices in the column such that the output line of the operational amplifier is electrically connected to the first drive line of only one EMS device at any one time. The charge injection circuit also includes an input capacitor circuit configured to be electrically connected to the inverting line of the operation amplifier or to a voltage circuit for charging the input capacitor circuit to a charge $Q_{in}$. The charge injection circuit is controlled to selectively connect the first drive line of each EMS device in the column, for each of the display elements in the column, to the output line of the operational amplifier while a charge from the input capacitor circuit is transferred to the first drive line of the EMS device electrically connected to the charge injection circuit.

In various implementations, each of the EMS devices includes an IMOD. Various implementations of the method can include connecting a storage capacitor having a storage capacitance value between the first stationary electrode layer and a first conductor of the movable electrode layer of each of the EMS devices that is proximal to the first stationary electrode layer. Various implementations of the method further can include connecting a bypass capacitor having a bypass capacitance value electrically between the inverting line of the operational amplifier and the bias voltage line of the bias voltage circuit. Various implementations of the method further can include connecting a clamping diode between the inverting line and the non-inverting line of the operational amplifier.

Details of one or more implementations of the subject matter described in this specification are set forth in the accompanying drawings and the description below. Although the examples provided in this disclosure are primarily described in terms of EMS and MEMS-based displays, the concepts provided herein may apply to other types of displays such as liquid crystal displays, organic light-emitting diode ("OLED") displays, and field emission displays. Other features, aspects, and advantages will become apparent from the description, the drawings, and the claims. Note that the relative dimensions of the following figures may not be drawn to scale.

BRIEF DESCRIPTION OF THE DRAWINGS

FIG. 10 shows another example of a cross-section of an AIMOD.

Like reference numbers and designations in the various drawings indicate like elements.

DETAILED DESCRIPTION

Figure 1A:
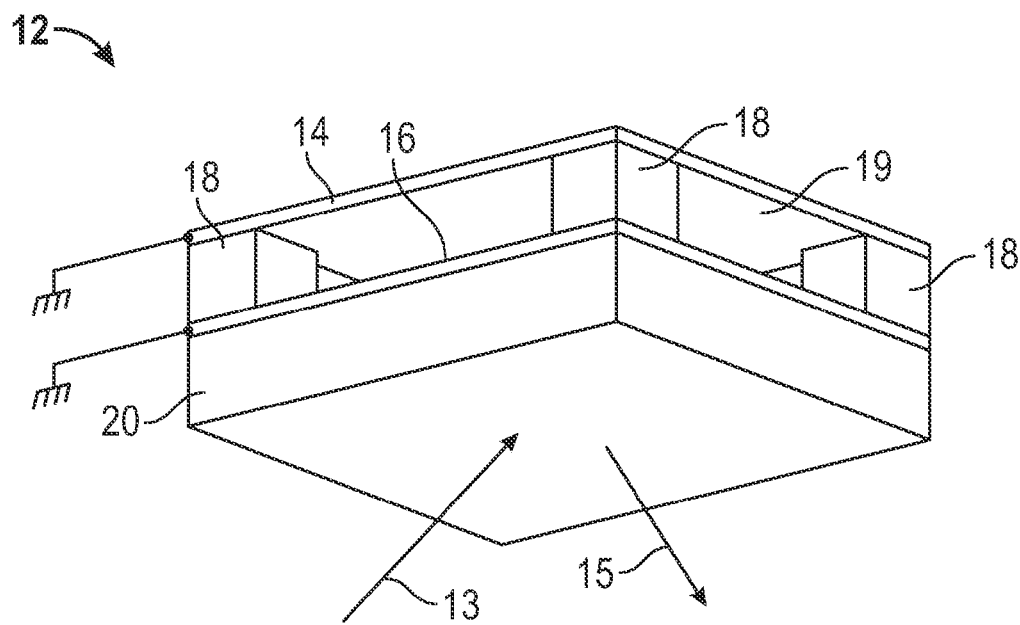
FIGS. 1A and 1B show examples of isometric views depicting a pixel of an interferometric modulator (IMOD) display device in two different states.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system that can be configured to display an image, whether in motion (such as video) or stationary (such as still images), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS), microelectromechanical systems (MEMS) and non-MEMS applications), aesthetic structures (such as display of images on a piece of jewelry or clothing) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

The EMS device can include an array of analog interferometric modulators (AIMODs) that are arranged in a plurality of rows and columns. In some implementations, an AIMOD can include a pair of stationary conducting layers separated by a gap and a reflective membrane disposed between the pair of stationary conducting layers. The AIMOD can be driven to several different states, each state having different optical properties. In each state the reflective membrane is actuated to a desired position between the pair of stationary conducting layers. Various implementations herein include systems and methods to drive the AIMOD such that the reflective membrane is precisely and deterministically actuated to a desired position to produce a reflection of a certain spectrum of wavelengths of light (or color of light).

Implementations of an AIMOD driving systems described herein can include a charge injection circuit that is configured to isolate a single AIMOD and transfer a desired amount of charge to the isolated AIMOD such that the reflective membrane is moved to the position that produces the desired optical effect. The charge injection circuit includes an operational amplifier, a capacitor that is switchably connected to the operational amplifier or a voltage source and a plurality of switches. The charge injection circuit is configured to charge the capacitor to a desired level by connecting to the voltage source. Subsequently, by the action of the plurality of switches only one AIMOD is placed in the feedback path of the operational amplifier at any one time. The desired charge from the capacitor is then transferred to the AIMOD to actuate the reflective membrane to the desired position.

Particular implementations of the subject matter described in this disclosure can be implemented to realize one or more of the following potential advantages. Implementations of the AIMOD driving systems including a charge injection circuit described herein permit transferring a desired amount of charge to actuate the AIMOD which has several advantages over other driving systems, such as, for example, a driving system that applies a voltage to actuate the AIMOD. One advantage is that when actuated by charge injection the electro-mechanics of the movement of the reflective membrane of the AIMOD are deterministic. In other words, because a particular charge is provided to each AIMOD (this being referred to herein as "charge injection") the movable reflective membrane can be controlled precisely and accurately moved to a number of desired positions to produce a desired color. Accordingly, the amount of charge used to move the reflective membrane to a desired position can be precisely determined. Additionally, since there is no ambiguity in the position of the reflective membrane when actuated by charge injection the AIMOD device layout can be simplified, without requiring patterned electrodes or in-pixel sense node buffers to determine the position of the reflective membrane. In implementations of display devices using AIMODs, the ability to actuate the reflective membrane to a desired position can be beneficial in enhancing the color resolution and/or contrast ratio of the display device. The drive circuit design includes a single charge injection circuit for each column of AIMODs in the array and switchably connecting the charge injection circuit for each column to an AIMOD in a row. Because this design allows for using one charge injection charge injection circuit for a plurality of AIMODs in a column, the design and layout of the drive circuit can be simplified and a footprint of the drive circuit can be reduced.

An example of a suitable EMS or MEMS device, to which the described implementations may apply, is a reflective display device. Reflective display devices can incorporate IMODs to selectively absorb and/or reflect light incident thereon using principles of optical interference. IMODs can include an absorber, a reflector that is movable with respect to the absorber, and an optical resonant cavity defined between the absorber and the reflector. The reflector can be moved to two or more different positions, which can change the size of the optical resonant cavity and thereby affect the reflectance of the IMOD. The reflectance spectrums of IMODs can create fairly broad spectral bands which can be shifted across the visible wavelengths to generate different colors. The position of the spectral band can be adjusted by changing the thickness of the optical resonant cavity, that is, by changing the position of the reflector.

Figure 1B:
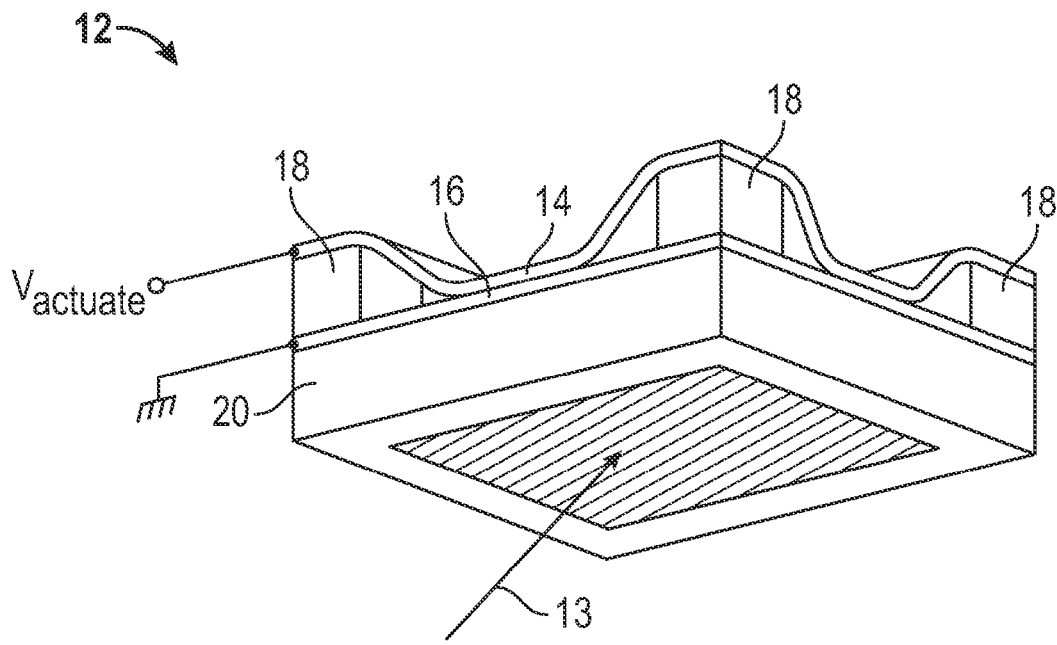

FIGS. 1A and 1B show examples of isometric views depicting a pixel of an IMOD display device in two different states. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, for example, to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white. As described in FIGS. 9 and 10, in some implementations IMOD display elements can be configured to have three or more different states, each state causing the IMOD display element to reflect light having a different spectrum of wavelengths.

The IMOD display device can include a row/column array of IMODs. Each IMOD can include a pair of reflective layers, that is, a movable reflective layer (or optical element) and a fixed partially reflective layer, positioned at a variable and controllable distance from each other to form an air gap (also referred to as an optical gap or cavity). The movable reflective layer may be moved between at least two positions. In a first position, that is, a relaxed position, the movable reflective layer can be positioned at a relatively large distance from the fixed partially reflective layer. In a second position, that is, an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when actuated, absorbing and/or destructively interfering light within the visible range. In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted pixels in FIGS. 1A and 1B depict two different states of an IMOD 12. In the IMOD 12 of FIG. 1A, a movable reflective layer 14 is illustrated in a relaxed position at a predetermined distance from an optical stack 16, which includes a partially reflective layer. Since no voltage is applied across the IMOD 12 in FIG. 1A, the movable reflective layer 14 remained in a relaxed or unactuated state. In the IMOD 12 of FIG. 1B, the movable reflective layer 14 is illustrated in an actuated position adjacent to the optical stack 16. The voltage $V_{actuate}$ applied across the IMOD 12 in FIG. 1B is sufficient to actuate the movable reflective layer 14 to an actuated position.

In FIGS. 1A and 1B, the reflective properties of pixels 12 are generally illustrated with arrows indicating light 13 incident upon the pixels 12, and light 15 reflecting from the pixel 12 on the left. A person having ordinary skill in the art will readily recognize that most of the light 13 incident upon the pixels 12 will be transmitted through the transparent substrate 20, toward the optical stack 16. A portion of the light incident upon the optical stack 16 will be transmitted through the partially reflective layer of the optical stack 16, and a portion will be reflected back through the transparent substrate 20. The portion of light 13 that is transmitted through the optical stack 16 will be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the pixels 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can include a layer of materials having light absorbing properties, for example, chromium (Cr) and vanadium (V). Such layers can have a thickness dimension of less than 10 nm. The partially reflective layer can be formed from a variety of materials that are partially reflective, such as various metals, such as chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and conductor, while different, electrically more conductive layers or portions (for example, of the optical stack 16 or of other structures of the IMOD) can serve to bus signals between IMOD pixels. The optical stack 16 also can include one or more insulating or dielectric layers covering one or more conductive layers or an electrically conductive/optically absorptive layer.

In some implementations, the lower electrode 16 is grounded at each pixel. In some implementations, this may be accomplished by depositing a continuous optical stack 16 onto the substrate and grounding the entire sheet at the periphery of the deposited layers. In some implementations, a highly conductive and reflective material, such as aluminum (Al), may be used for the movable reflective layer 14. The movable reflective layer 14 may be formed as a metal layer or layers deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be approximately 1-1000 um, while the gap 19 may be less than 10,000 Angstroms (Å).

In some implementations, each pixel of the IMOD, whether in the actuated or relaxed state, is essentially a capacitor formed by the fixed and moving reflective layers. When no voltage is applied, the movable reflective layer 14a remains in a mechanically relaxed state, as illustrated by the pixel 12 in FIG. 1A, with the gap 19 between the movable reflective layer 14 and optical stack 16. However, when a potential difference, for example, voltage, is applied to at least one of the movable reflective layer 14 and optical stack 16, the capacitor formed at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated pixel 12 in FIG. 1B. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

In some implementations, the optical stacks 16 in a series or array of IMODs can serve as a common electrode that provides a common voltage to one side of the IMODs of the display device. The movable reflective layers 14 may be formed as an array of separate plates arranged in, for example, a matrix form, as described further below. The separate plates can be supplied with voltage signals for driving the IMODs.

Figure 3:
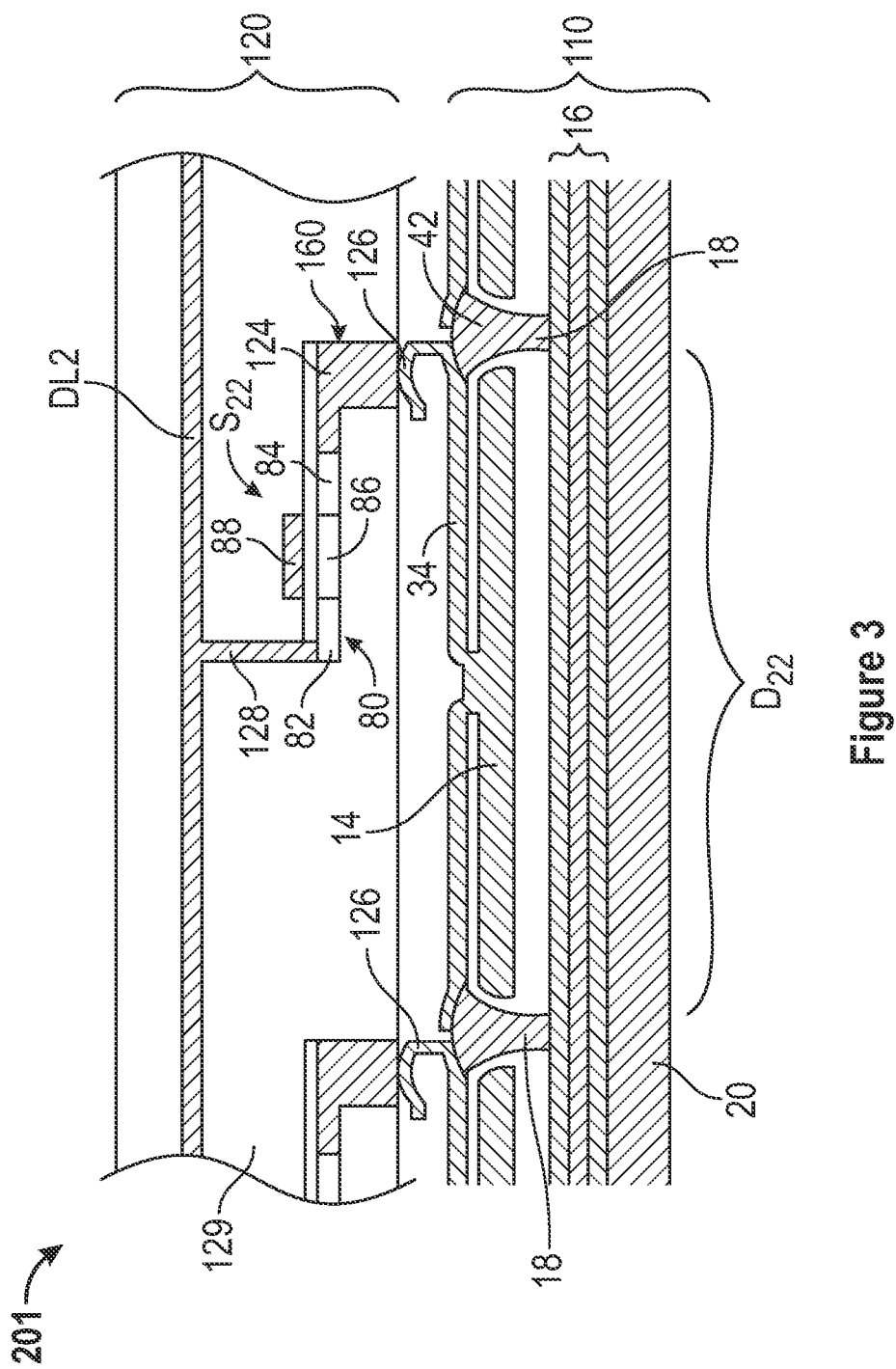
FIG. 3 shows an example of a schematic partial cross-section illustrating one implementation of the structure of the driving circuit and the associated display element of FIG. 2.

The details of the structure of IMODs that operate in accordance with the principles set forth above may vary widely. For example, the movable reflective layers 14 of each IMOD may be attached to supports at the corners only, for example, on tethers. As shown in FIG. 3, a flat, relatively rigid reflective layer 14 may be suspended from a deformable layer 34, which may be formed from a flexible metal. This architecture allows the structural design and materials used for the electromechanical aspects and the optical aspects of the modulator to be selected, and to function, independently of each other. Thus, the structural design and materials used for the reflective layer 14 can be optimized with respect to the optical properties, and the structural design and materials used for the deformable layer 34 can be optimized with respect to desired mechanical properties. For example, the reflective layer 14 portion may be aluminum, and the deformable layer 34 portion may be nickel. The deformable layer 34 may connect, directly or indirectly, to the substrate 20 around the perimeter of the deformable layer 34. These connections may form the support posts 18.

In implementations such as those shown in FIGS. 1A and 1B, the IMODs function as direct-view devices, in which images are viewed from the front side of the transparent substrate 20, that is, the side opposite to that upon which the modulator is arranged. In these implementations, the back portions of the device (that is, any portion of the display device behind the movable reflective layer 14, including, for example, the deformable layer 34 illustrated in FIG. 3) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, such as voltage addressing and the movements that result from such addressing.

Figure 2:
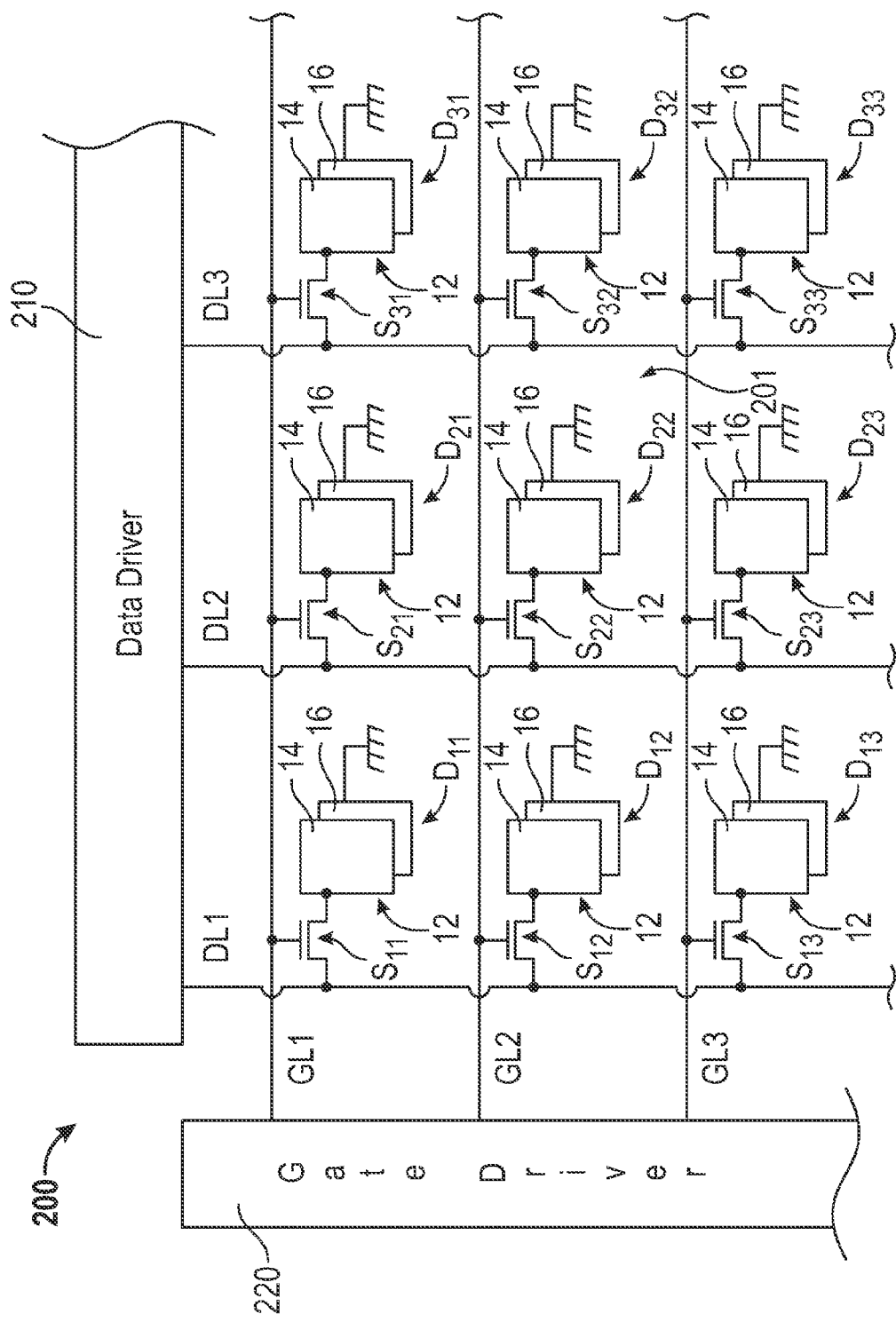
FIG. 2 shows an example of a schematic circuit diagram illustrating a driving circuit array for an optical MEMS display device.

FIG. 2 shows an example of a schematic circuit diagram illustrating a driving circuit array 200 for an optical MEMS display device. The driving circuit array 200 can be used for implementing an active matrix addressing scheme for providing image data to display elements $D_{11}$-$D_{mn}$ of a display array assembly. In at least some implementations of active matrix addressing, the row signal drives the gate of a transistor switch at each pixel and the IMOD is connected to the source of the transistor and the remaining IMOD electrode can be grounded. Active matrix addressing can have a much higher frame rate capability because the pixels can be connected to the column lines through the transistor, avoiding cross-talk and large capacitances that can be seen in passive matrix implementations.

The driving circuit array 200 includes a data driver 210, a gate driver 220, first to m-th data lines DL1-DLm, first to n-th gate lines GL1-GLn, and an array of switches or switching circuits $S_{11}$-$S_{mn}$. Each of the data lines DL1-DLm extends from the data driver 210, and is electrically connected to a respective column of switches $S_{11}$-$S_{1n}$, $S_{21}$-$S_{2n}$, ..., $S_{m1}$-$S_{mn}$. Each of the gate lines GL1-GLn extends from the gate driver 220, and is electrically connected to a respective row of switches $S_{11}$-$S_{m1}$, $S_{12}$-$S_{m2}$, ..., $S_{1n}$-$S_{mn}$. The switches $S_{11}$-$S_{mn}$ are electrically coupled between one of the data lines DL1-DLm and a respective one of the display elements $D_{11}$-$D_{mn}$ and receive a switching control signal from the gate driver 220 via one of the gate lines GL1-GLn. The switches $S_{11}$-$S_{mn}$ are illustrated as single FET transistors, but may take a variety of forms such as two transistor transmission gates (for current flow in both directions) or even mechanical MEMS switches.

The data driver 210 can receive image data from outside the display, and can provide the image data on a row by row basis in a form of voltage signals to the switches $S_{11}$-$S_{mn}$ via the data lines DL1-DLm. The gate driver 220 can select a particular row of display elements $D_{11}$-$D_{m1}$, $D_{12}$-$D_{m2}$, ..., $D_{1n}$-$D_{mn}$ by turning on the switches $S_{11}$-$S_{m1}$, $S_{12}$-$S_{m2}$, ..., $S_{1n}$-$S_{mn}$ associated with the selected row of display elements $D_{11}$-$D_{m1}$, $D_{12}$-$D_{m2}$, ..., $D_{1n}$-$D_{mn}$. When the switches $S_{11}$-$S_{m1}$, $S_{12}$-$S_{m2}$, ..., $S_{1n}$-$S_{mn}$ in the selected row are turned on, the image data from the data driver 210 is passed to the selected row of display elements $D_{11}$-$D_{m1}$, $D_{12}$-$D_{m2}$, ..., $D_{1n}$-$D_{mn}$.

During operation, the gate driver 220 can provide a voltage signal via one of the gate lines GL1-GLn to the gates of the switches $S_{11}$-$S_{mn}$ in a selected row, thereby turning on the switches $S_{11}$-$S_{mn}$. After the data driver 210 provides image data to all of the data lines DL1-DLm, the switches $S_{11}$-$S_{mn}$ of the selected row can be turned on to provide the image data to the selected row of display elements $D_{11}$-$D_{m1}$, $D_{12}$-$D_{m2}$, ..., $D_{1n}$-$D_{mn}$, thereby displaying a portion of an image. For example, data lines DL that are associated with pixels that are to be actuated in the row can be set to, for example, 10-volts (could be positive or negative), and data lines DL that are associated with pixels that are to be released in the row can be set to, for example, 0-volts. Then, the gate line GL for the given row is asserted, turning the switches in that row on, and applying the selected data line voltage to each pixel of that row. This charges and actuates the pixels that have 10-volts applied, and discharges and releases the pixels that have 0-volts applied. Then, the switches $S_{11}$-$S_{mn}$ can be turned off. The display elements $D_{11}$-$D_{m1}$, $D_{12}$-$D_{m2}$, ..., $D_{1n}$-$D_{mn}$ can hold the image data because the charge on the actuated pixels will be retained when the switches are off, except for some leakage through insulators and the off state switch. Generally, this leakage is low enough to retain the image data on the pixels until another set of data is written to the row. These steps can be repeated to each succeeding row until all of the rows have been selected and image data has been provided thereto. In the implementation of FIG. 2, the lower electrode 16 is grounded at each pixel. In some implementations, this may be accomplished by depositing a continuous optical stack 16 onto the substrate and grounding the entire sheet at the periphery of the deposited layers. FIG. 3 illustrates an example of a schematic partial cross-section illustrating one implementation of the structure of the driving circuit and the associated display element of FIG. 2.

FIG. 3 shows an example of a schematic partial cross-section illustrating one implementation of the structure of the driving circuit and the associated display element of FIG. 2. The portion 201 of the driving circuit array 200 includes the switch $S_{22}$ at the second column and the second row, and the associated display element $D_{22}$. In the illustrated implementation, the switch $S_{22}$ includes a transistor 80. Other switches in the driving circuit array 200 can have the same configuration as the switch $S_{22}$.

FIG. 3 also includes a portion of a display array assembly 110, and a portion of a backplate 120. The portion of the display array assembly 110 includes the display element $D_{22}$ of FIG. 2. The display element $D_{22}$ includes a portion of a front substrate 20, a portion of an optical stack 16 formed on the front substrate 20, supports 18 formed on the optical stack 16, a movable electrode 14/34 supported by the supports 18, and an interconnect 126 electrically connecting the movable electrode 14/34 to one or more components of the backplate 120.

The portion of the backplate 120 includes the second data line DL2 and the switch $S_{22}$ of FIG. 2, which are embedded in the backplate 120. The portion of the backplate 120 also includes a first interconnect 128 and a second interconnect 124 at least partially embedded therein. The second data line DL2 extends substantially horizontally through the backplate 120. The switch $S_{22}$ includes a transistor 80 that has a source 82, a drain 84, a channel 86 between the source 82 and the drain 84, and a gate 88 overlying the channel 86. The transistor 80 can be a thin film transistor (TFT) or metal-oxide-semiconductor field effect transistor (MOSFET). The gate of the transistor 80 can be formed by gate line GL2 extending through the backplate 120 perpendicular to data line DL2. The first interconnect 128 electrically couples the second data line DL2 to the source 82 of the transistor 80.

The transistor 80 is coupled to the display element $D_{22}$ through one or more vias 160 through the backplate 120. The vias 160 are filled with conductive material to provide electrical connection between components (for example, the display element $D_{22}$) of the display array assembly 110 and components of the backplate 120. In the illustrated implementation, the second interconnect 124 is formed through the via 160, and electrically couples the drain 84 of the transistor 80 to the display array assembly 110. The backplate 120 also can include one or more insulating layers 129 that electrically insulate the foregoing components of the driving circuit array 200.

As shown in FIG. 3, the display element $D_{22}$ can be an IMOD that has a first terminal coupled to the transistor 80, and a second terminal coupled to a common electrode that can be formed by at least part of an optical stack 16. The optical stack 16 of FIG. 3 is illustrated as three layers, a top dielectric layer described above, a middle partially reflective layer (such as chromium) also described above, and a lower layer including a transparent conductor (such as indium-tin-oxide (ITO)). The common electrode is formed by the lower layer and can be coupled to ground at the periphery of the display.

Figure 4:
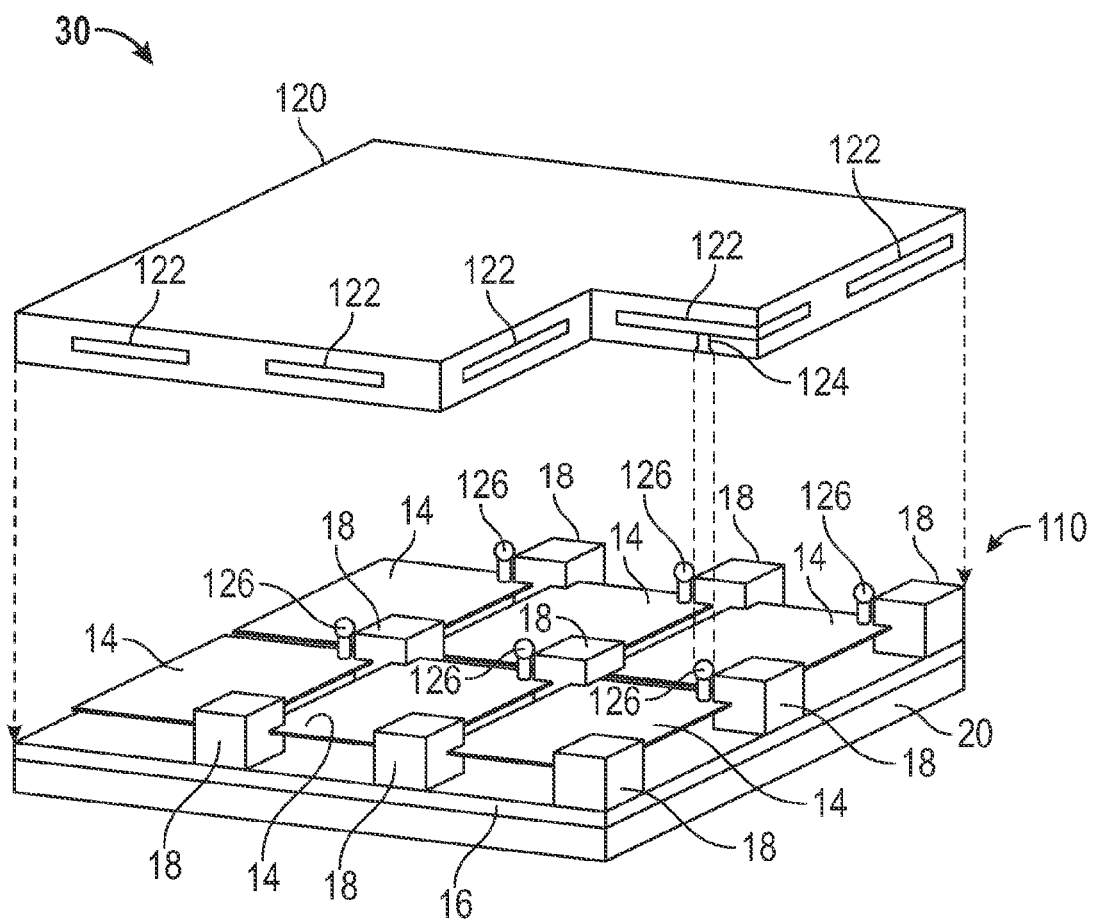
FIG. 4 shows an example of a schematic exploded partial perspective view of an optical MEMS display device having an IMOD array and a backplate with embedded circuitry.

FIG. 4 shows an example of an exploded partial perspective view of an optical MEMS display device 30 having an IMOD array and a backplate with embedded circuitry. The display device 30 includes a display array assembly 110 and a backplate 120. In some implementations, the display array assembly 110 and the backplate 120 can be separately pre-formed before being attached together. In some other implementations, the display device 30 can be fabricated in any suitable manner, such as, by forming components of the backplate 120 over the display array assembly 110 by deposition.

The display array assembly 110 can include a front substrate 20, an optical stack 16, supports 18, movable electrodes 14, and interconnects 126. The backplate 120 includes backplate components 122 at least partially embedded therein, and one or more backplate interconnects 124.

The optical stack 16 of the display array assembly 110 can be a substantially continuous layer covering at least the array region of the front substrate 20. The optical stack 16 can include a substantially transparent conductive layer that is electrically connected to ground. The movable electrodes 14/34 can be separate plates having, for example, a square or rectangular shape. The movable electrodes 14/34 can be arranged in a matrix form such that each of the movable electrodes 14/34 can form part of a display element. In the implementation of FIG. 4, the movable electrodes 14/34 are supported by the supports 18 at four corners.

Each of the interconnects 126 of the display array assembly 110 serves to electrically couple a respective one of the movable electrodes 14/34 to one or more backplate components 122. In the illustrated implementation, the interconnects 126 of the display array assembly 110 extend from the movable electrodes 14/34, and are positioned to contact the backplate interconnects 124. In another implementation, the interconnects 126 of the display array assembly 110 can be at least partially embedded in the supports 18 while being exposed through top surfaces of the supports 18. In such an implementation, the backplate interconnects 124 can be positioned to contact exposed portions of the interconnects 126 of the display array assembly 110. In yet another implementation, the backplate interconnects 124 can extend to and electrically connect to the movable electrodes 14 without actual attachment to the movable electrodes 14, such as the interconnects 126 of FIG. 4.

In addition to the bi-stable IMODs described above, which have a relaxed state and an actuated state, IMODs may be designed to have a plurality of states. For example, an analog interferometric modulator (AIMOD) may have a range of color states. In one AIMOD implementation, a single IMOD can be actuated into, for example, at least a red state, a green state, a blue state, a black state, and a white state. Accordingly, a single IMOD may be configured to have various states with different light reflectance properties over a wide range of the optical spectrum. The optical stack of an AIMOD may differ from the bi-stable display elements described above. These differences may produce different optical results. For example, in the bi-stable elements described above, the closed state gives the bi-stable element a black reflective state. An AIMOD, however, may have a white reflective state when the electrodes are in a similar position to the closed state of the bi-stable element.

Figure 5:
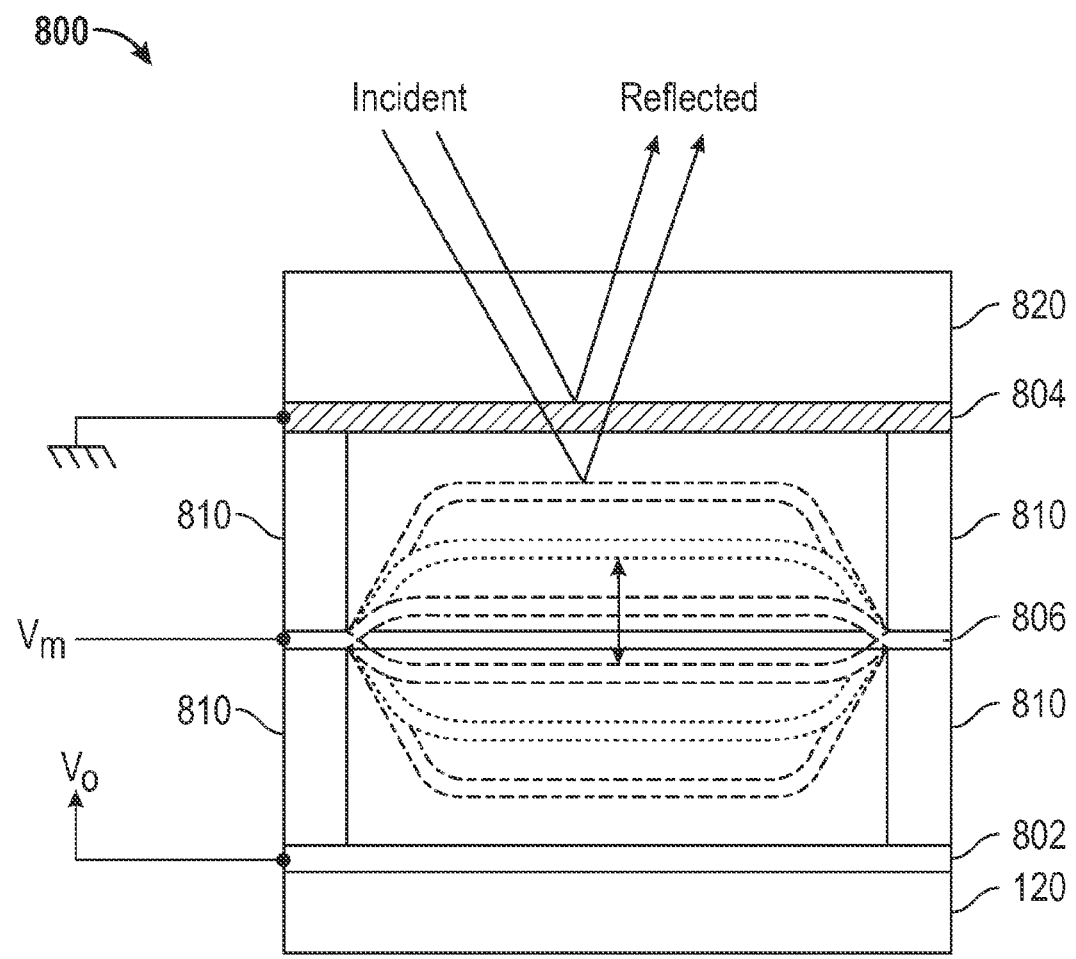
FIG. 5 shows a cross-section of an example of an IMOD having two fixed layers and a movable third layer.

FIG. 5 shows a cross-section of an example of an IMOD having two fixed layers and a movable third layer. Specifically, FIG. 5 shows an implementation of an AIMOD 800 having a fixed first layer 802, a fixed second layer 804, and a movable third layer 806 positioned between the fixed first and second layers 802 and 804. Each of the layers 802, 804 and 806 may include an electrode or other conductive material. For example, the first layer 802 may include a plate made of metal. Each of the layers 802, 804 and 806 may be stiffened using a stiffening layer formed on or deposited on the respective layer. In some implementations, the stiffening layer includes a dielectric. The stiffening layer may be used to keep the layer to which it is attached rigid and substantially flat. Some implementations of the IMOD 800 may be referred to as a three-terminal IMOD.

The three layers 802, 804 and 806 are electrically insulated by insulating posts 810. The movable third layer 806 is suspended from the insulating posts 810. The movable third layer 806 is configured to deform such that the movable third layer 806 may be displaced in a generally upward direction toward the first layer 802, or may be displaced in a generally downward direction toward to the second layer 804 (collectively known as the outer layers 802 and 804). In some implementations, the first layer 802 also may be referred to as the top layer or top electrode. In some implementations, the second layer 804 also may be referred to as the bottom layer or bottom electrode. The IMOD 800 may be supported by a substrate 820.

In FIG. 5, the equilibrium position of the movable third layer 806 is indicated with solid lines. As illustrated in FIG. 5, a fixed voltage difference may be applied between the first layer 802 and the second layer 804. In this implementation, a voltage $V_0$ is applied to the first layer 802 while the second layer 804 is grounded. If a variable voltage $V_m$ is applied to the movable third layer 806, then as that voltage $V_m$ approaches $V_0$, the movable third layer 806 will be electrostatically pulled toward the grounded second layer 804. As that voltage $V_m$ approaches ground, the movable third layer 806 will be electrostatically pulled toward the first layer 802. If a voltage at the midpoint of these two voltages ($V_0/2$ in this implementation) is applied to the movable third layer 806, then the movable third layer 806 will be maintained in its equilibrium position indicated with solid lines in FIG. 5. By applying a variable voltage to the movable third layer 806 that is between the voltages on the outer layers 802 and 804, the movable third layer 806 can be positioned at a desired location between the outer layers 802 and 804, producing a desired optical response. The voltage difference $V_0$ between the outer layers 802 and 804 can vary widely depending on the materials and construction of the device, and in many implementations may be in the range of about 5-20 volts. It also may be noted that as the movable third layer 806 moves away from this equilibrium position, it will deform or bend. In such a deformed or bent configuration, an elastic spring force mechanically biases the movable third layer 806 toward the equilibrium position. This mechanical force also contributes to the final position of the movable third layer 806 when a voltage $V_m$ is applied there.

The movable third layer 806 may include a mirror to reflect light entering the IMOD 800 through the substrate 820. The mirror may include a metal material. The second layer 804 may include a partially absorbing material such that the second layer 804 acts as an absorbing layer. When light reflected from the mirror is viewed from the side of the substrate 820, the viewer may perceive the reflected light as a certain color. By adjusting the position of the movable third layer 806, certain wavelengths of light may be selectively reflected.

Figure 6:
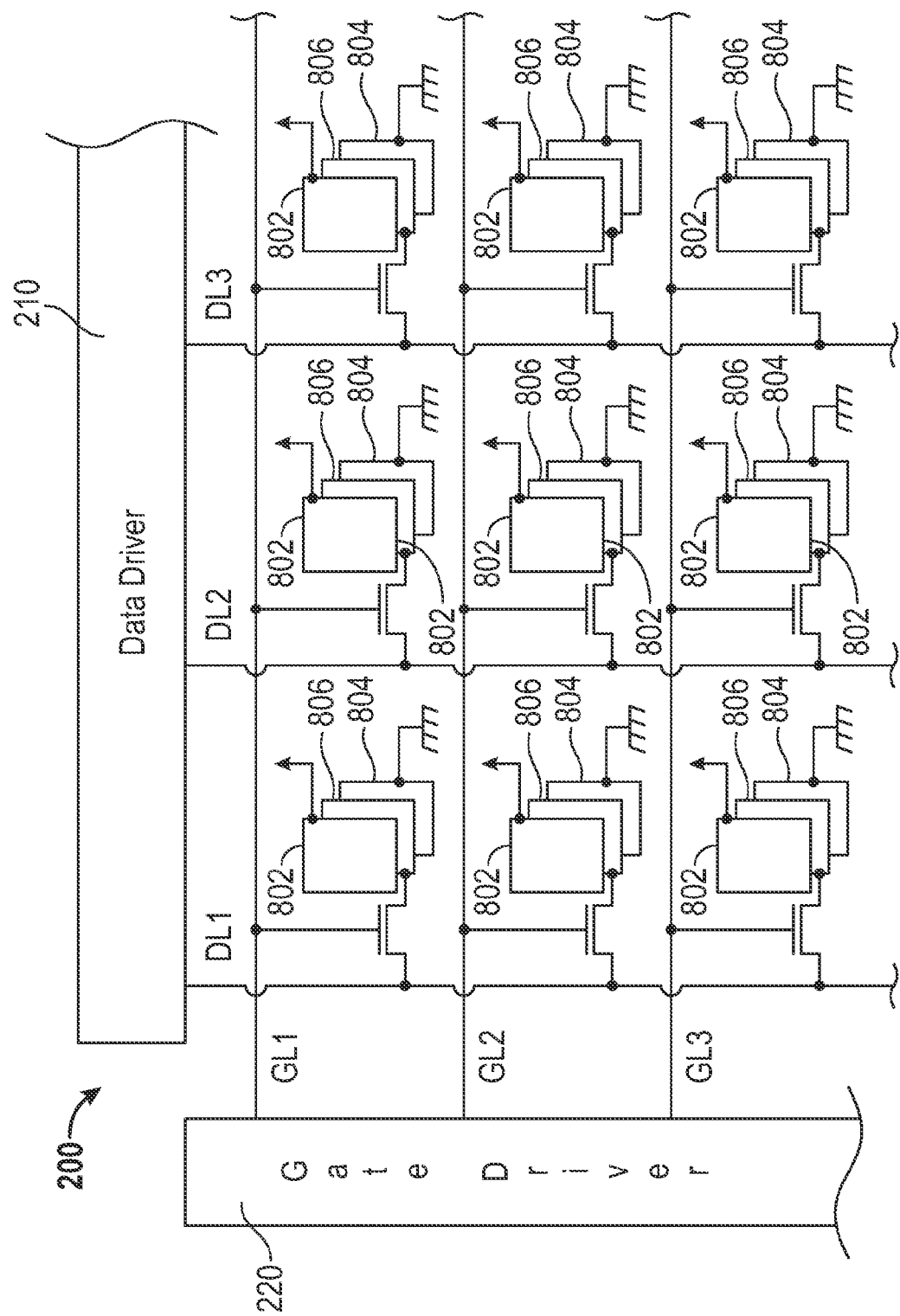
FIG. 6 shows an example of a schematic circuit diagram illustrating a driving circuit array for an optical EMS display device having the structure of FIG. 5.

FIG. 6 shows an example of a schematic circuit diagram illustrating a driving circuit array for an optical EMS display device having the structure of FIG. 5. The overall apparatus shares many similarities to the structure of FIG. 2 that uses the bi-stable IMODs. As shown in FIG. 6, however, an additional first layer 802 is provided for each display element. This first layer 802 may be deposited on the underside of the backplate 120 shown in FIGS. 3 and 4, and may have a voltage $V_0$ applied thereto. These implementations are driven in a manner similar to that described above with reference to FIG. 2, except the voltages provided on the data lines DL1-DLn can be placed at a range of voltages between $V_0$ and ground, rather than at one of only two different voltages. In this way, the movable third layers 806 of the display elements along a row each can be independently placed in any particular desired position between the first layer 802 and the second layer 804 when the row is written by asserting the gate line for that particular row.

Figure 7A:
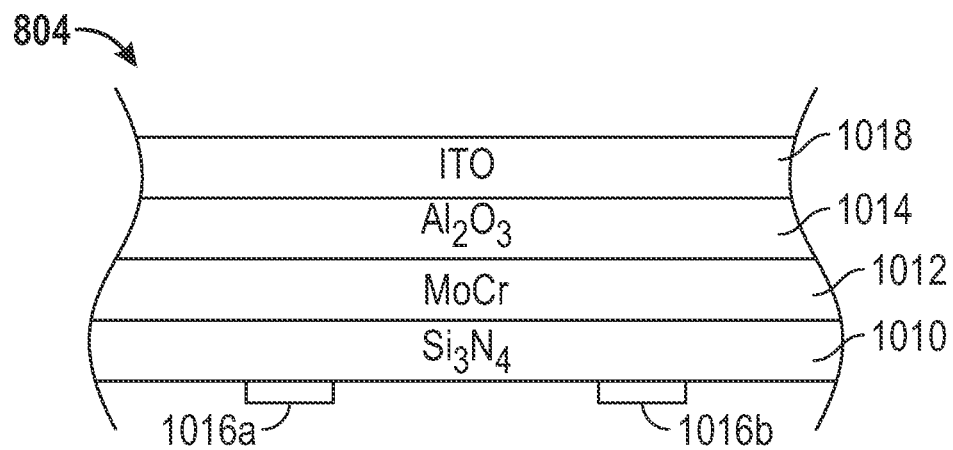
FIGS. 7A-7C show cross-sections of the two fixed layers and the movable layer of the IMOD depicted in FIG. 5 illustrating stacks of materials.
Figure 7B:
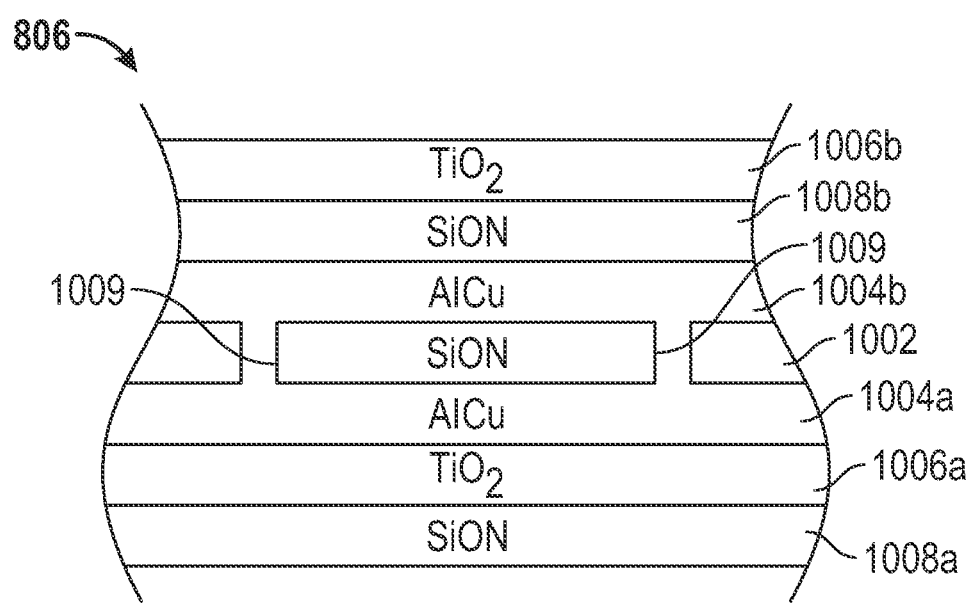
Figure 7C:
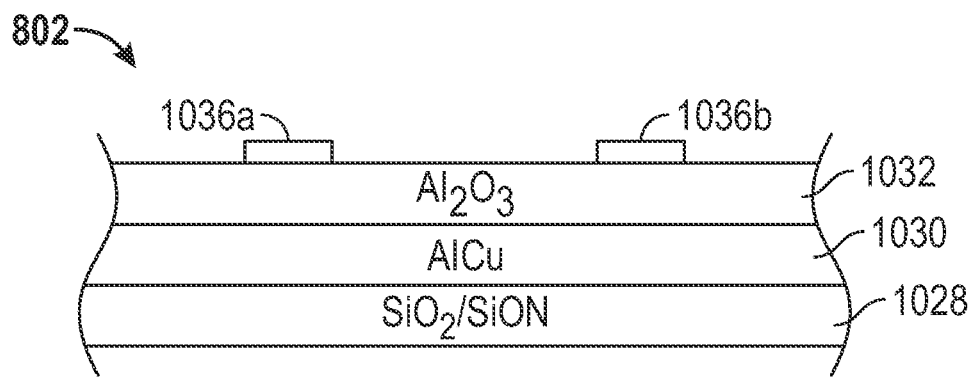

FIGS. 7A-7C show cross-sections of the two fixed layers and the movable layer of the IMOD depicted in FIG. 5 illustrating stacks of materials.

In the implementation illustrated in FIGS. 7A and 7B, the movable third layer 806 and the second layer 804 each include a stack of materials. For example, the movable third layer 806 includes a stack including silicon oxynitride (SiON), aluminum-copper (AlCu), and titanium dioxide ($TiO_2$). The second layer 804, for example, includes a stack including silicon oxynitride (SiON), aluminum oxide ($Al_2O_3$), molybdenum-chromium (MoCr), and silicon dioxide ($SiO_2$).

In the implementation illustrated in FIG. 7B, the movable third layer 806 includes a SiON substrate 1002 having an AlCu layer 1004a deposited thereon. In this implementation, the AlCu layer 1004a is conductive and may be used as an electrode. In some implementations, the AlCu layer 1004a provides reflectivity for light incident thereon. In some implementations, a thickness of the SiON substrate 1002 is between approximately 100 nm and approximately 5000 nm, and a thickness of the AlCu layer 1004a is between approximately 10 nm and approximately 100 nm. A $TiO_2$ layer 1006a is deposited on the AlCu layer 1004a, and in some implementations a thickness of the $TiO_2$ layer 1006a is between approximately 10 nm and approximately 50 nm. A SiON layer 1008a is deposited on the $TiO_2$ layer 1006a, and in some implementations a thickness of the SiON layer 1008a is between approximately 20 nm and approximately 200 nm The refractive index of the $TiO_2$ layer 1006a is greater than the refractive index of the SiON layer 1008a. Forming a stack of materials with alternating high and low refractive indices in this way may cause light incident on the stack to be reflected, thereby acting substantially as a mirror.

As can be seen in FIG. 7B, the movable third layer 806 may in some implementations include an additional AlCu layer 1004b, an additional $TiO_2$ layer 1006b, and an additional SiON layer 1008b formed on the side of the SiON substrate 1002 opposite the AlCu layer 1004a, $TiO_2$ layer 1006a, and SiON layer 1008a. Forming the layers 1004b, 1006b, and 1008b may balance the movable third layer 806 approximately equally on each side of the SiON substrate 1002, which may increase the positional accuracy and stability of the movable third layer 806 when translating the movable third layer 806. In such implementations, a via 1009 or other electrical connection may be formed between the AlCu layers 1004a and 1004b such that the voltage of the two AlCu layers 1004a and 1004b will remain substantially equal. In this way, when a voltage is applied to one of these two layers, the other of these two layers will receive the same voltage. Additional vias (not shown) may be formed between the AlCu layers 1004a and 1004b.

In the implementation illustrated in FIG. 7A, the second layer 804 includes a $Si_3N_4$ substrate 1010 having an MoCr layer 1012 formed thereon. In this implementation, the MoCr layer 1012 may act as a discharge layer to discharge accumulated charge, and may be coupled to a transistor to selectively effect the discharge. The MoCr layer 1012 also may serve as an optical absorber. A thickness of the $Si_3N_4$ substrate 1010 can be between approximately 10 nm and approximately 100 nm. In some implementations, a thickness of the MoCr layer 1012 is between approximately 2 nm and approximately 50 nm. In various implementations, the layer 1012 can include Vanadium (V) instead of MoCr. An $Al_2O_3$ layer 1014 is formed on the MoCr layer 1012, and may provide some reflectance of light incident thereon and also may serve as a bussing layer in some implementations. In some implementations, a thickness of the $Al_2O_3$ layer 1014 is between approximately 5 nm and approximately 50 nm. One or more SiON stops 1016a and 1016b may be formed on the surface of the $Al_2O_3$ layer 1014. These stops 1016 can be implemented to mechanically prevent the movable third layer 806 from contacting the $Al_2O_3$ layer 1014 of the second layer 804 when the movable third layer 806 is deflected fully towards the second layer 804. This may reduce stiction and snap-in of the device. Further, an electrode layer 1018 may be formed on the $SiO_2$ substrate 1010, as shown in FIG. 7. The electrode layer 1018 may include any number of substantially transparent electrically conductive materials, with indium tin oxide being one suitable material.

The first layer 802 illustrated in FIG. 7C. The structure of the first layer 802 can be simpler as compared to the structure of the second layer 804 or the movable third layer 806 since the first layer 802 has fewer optical and mechanical requirements to fulfill. This layer may include a substrate of SiO2 or SiON 1028, a conductive layer of AlCu 1030 and an optional insulating $Al_2O_3$ layer 1032. A thickness of the substrate 1028 can be between approximately 500 nm and approximately 5000 nm. In various implementations, the substrate 1028 can provide mechanical rigidity or stability to the first layer 802.

As with layer 804, one or more SiON stops 1036a and 1036b may be formed on the surface of the $Al_2O_3$ layer 1032.

Figure 8:
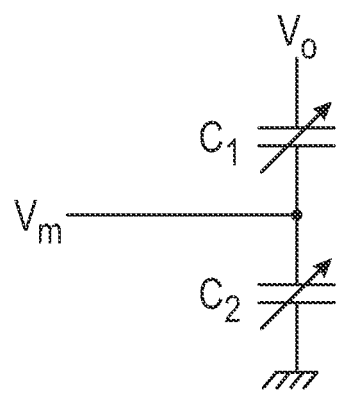
FIG. 8 shows a schematic representation of the IMOD and voltage sources illustrated in FIG. 5.

FIG. 8 shows a schematic representation of the IMOD 800 and voltage sources illustrated in FIG. 5. In this schematic, the IMOD is coupled to the voltage sources $V_0$ and $V_m$. A person having ordinary skill in the art will readily appreciate that the gap between the first layer 802 and the movable third layer 806 forms a capacitor $C_1$ having a variable capacitance, while the gap between the movable third layer 806 and the second layer 804 forms a capacitor $C_2$ also having a variable capacitance. Thus, in the schematic representation illustrated in FIG. 8, the voltage source $V_0$ is connected across the series coupled variable capacitors $C_1$ and $C_2$, while the voltage source $V_m$ is connected between the two variable capacitors $C_1$ and $C_2$.

Accurately driving the movable third layer 806 to different positions using the voltage sources $V_0$ and $V_m$ as described above, however, may be difficult with many configurations of the IMOD 800 because the relationship between voltage applied to the IMOD 800 and the position of the movable third layer 806 may be highly non-linear. Further, applying the same voltage $V_m$ to the movable layers of different IMODs may not cause the respective movable layers to move to the same position relative to the top and bottom layers of each modulator due to manufacturing differences, for example, variations in thickness or elasticity of the middle layers 806 over the entire display surface. As the position of the movable layer will determine what color is reflected from the IMOD, as discussed above, it is advantageous to be able to detect the position of the movable layer and to accurately drive the movable layer to desired positions.

Figure 9:
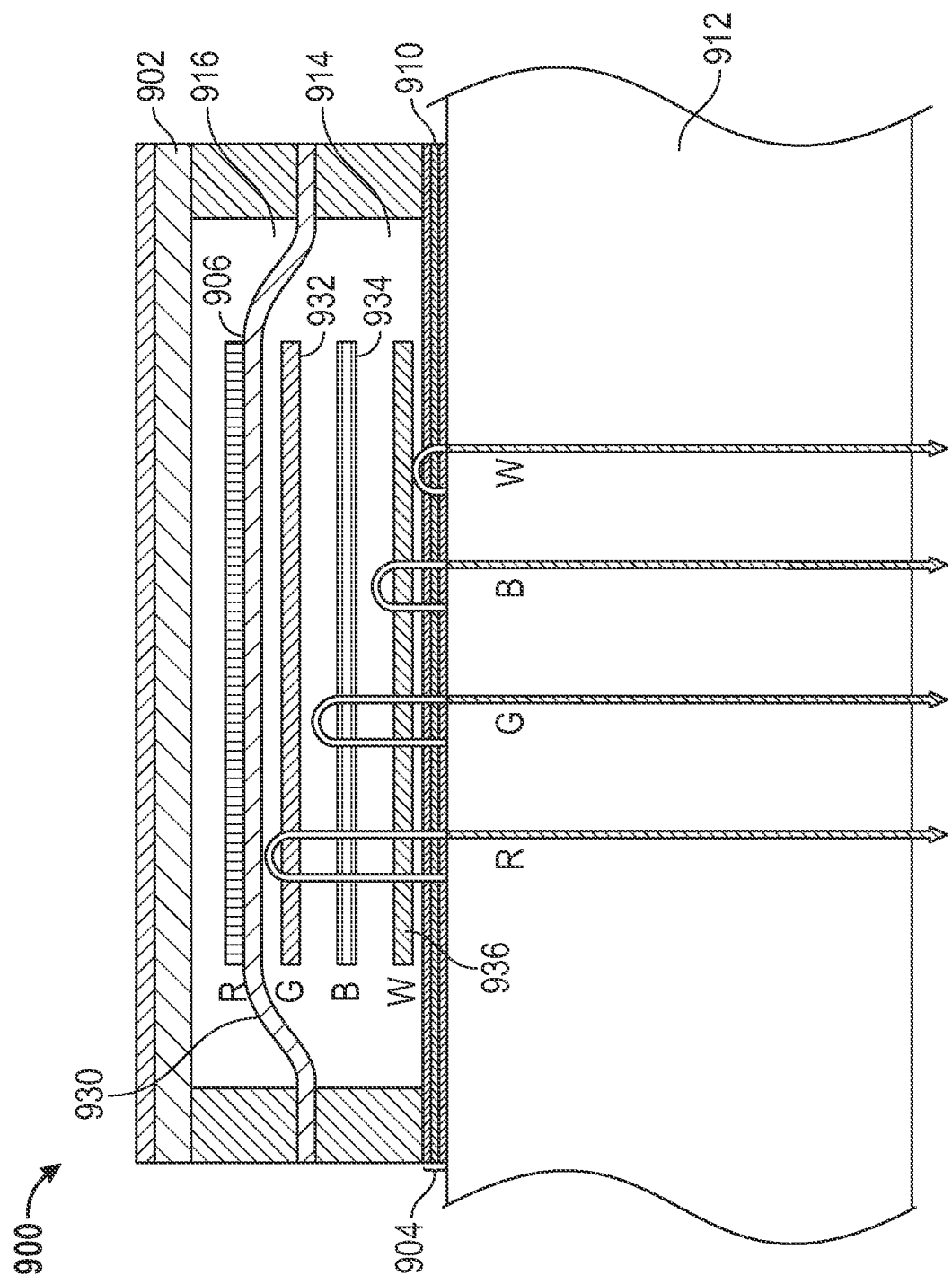
FIG. 9 shows an example of a cross-section of an analog IMOD (AIMOD).

FIG. 9 shows an example of a cross-section of an AIMOD. The AIMOD 900 includes a substrate 912 and an optical stack 904 disposed over the substrate 912. The AIMOD includes a first electrode 910 and a second electrode 902 (as illustrated, the first electrode 910 is a lower electrode, and second electrode 902 is an upper electrode). The AIMOD 900 also includes a movable reflective layer 906 disposed between the first electrode 910 and the second electrode 902. In some implementations, the optical stack 904 includes an absorbing layer, and/or a plurality of other layers. In some implementations, and in the example illustrated in FIG. 9, the optical stack 904 includes the first electrode 910 which is configured as an absorbing layer. In such a configuration, the absorbing layer (first electrode 910) can be an approximately 6 nm layer of material that includes MoCr. In some implementations, the absorbing layer (that is, the first electrode 910) can be a layer of material including MoCr with a thickness ranging from approximately 2 nm to 50 nm.

Still referring to FIG. 9, the reflective layer 906 can be provided with a charge. The reflective layer is configured to, once charged, move toward either the first electrode 910 or the second electrode 902 when a voltage is applied between the first and second electrodes 910 and 902. In this manner, the reflective layer 906 can be driven through a range of positions between the two electrodes 902 and 910, including above and below a relaxed (unactuated) state. For example, FIG. 9 illustrates that the reflective layer 906 can be moved to various positions 930, 932, 934 and 936 between the first electrode 910 and the second electrode 902.

The AIMOD 900 can be configured to selectively reflect certain wavelengths of light depending on the configuration of the AIMOD. The distance between the first electrode 910, which in this implementation acts as an absorbing layer, and the reflective layer 906 changes the reflective properties of the AIMOD 900. Any particular wavelength is maximally reflected from the AIMOD 900 when the distance between the reflective layer 906 and the absorbing layer (first electrode 910) is such that the absorbing layer (first electrode 910) is located at the minimum light intensity of standing waves resulting from interference between incident light and light reflected from the reflective layer 906. For example, as illustrated, the AIMOD 900 is designed to be viewed from the substrate 912 side of the AIMOD (through the substrate 912), that is, light enters the AIMOD 900 through the substrate 912. Depending on the position of the reflective layer 906, different wavelengths of light are reflected back through the substrate 912, which gives the appearance of different colors. These different colors are also referred to as native colors.

A position of a movable layer(s) of a display element (for example, an AIMOD) at a location such that it reflects a certain wavelength or wavelengths can be referred to a display state. For example, when the reflective layer 906 is in position 930, red wavelengths of light are reflected in greater proportion than other wavelengths and the other wavelengths of light are absorbed in greater proportion than red. Accordingly, the AIMOD 900 appears red and is said to be in a red display state, or simply a red state. Similarly, the AIMOD 900 is in a green display state (or green state) when the reflective layer 906 moves to position 932, where green wavelengths of light are reflected in greater proportion than other wavelengths and the other wavelengths of light are absorbed in greater proportion than green. When the reflective layer 906 moves to position 934, the AIMOD 900 is in a blue display state (or blue state) and blue wavelengths of light are reflected in greater proportion than other wavelengths and the other wavelengths of light are absorbed in greater proportion than blue. When the reflective layer 906 moves to a position 936, the AIMOD 900 is in a white display state (or white state) and a broad range of wavelengths of light in the visible spectrum are substantially reflected such that and the AIMOD 900 appears "grey" or in some cases "silver," and having low total reflection (or luminance) when a bare metal reflector is used. In some cases increased total reflection (or luminance) can be achieved with the addition of dielectric layers disposed on the metal reflector, but the reflected color may be tinted with blue, green or yellow, depending on the exact position of 936. In some implementations, in position 936, configured to produce a white state, the distance between the reflective layer 906 and the first electrode 910 is between about 0 and 20 nm. It should be noted that a person having ordinary skill in the art will readily recognize that the AIMOD 900 can take on different states and selectively reflect other wavelengths of light based on the position of the reflective layer 906, and also based on materials that are used in construction of the AIMOD 900, particularly various layers in the optical stack 904.

The AIMOD 900 in FIG. 9 has two structural cavities, a first cavity 914 between the reflective layer 906 and the optical stack 904, and a second cavity 916 between the reflective layer 906 and the second electrode 902. However, because the reflective layer 906 is reflective and not transmissive, light does not propagate through the reflective layer 906 into the second cavity 916. In addition, the color and/or intensity of light reflected by the AIMOD 900 is determined by the distance between the reflective layer 906 and the absorbing layer (first electrode 910). Accordingly, the AIMOD 900 illustrated in FIG. 9 has one interferometric (absorbing) cavity 914. In contrast, the second cavity 916 is not interferometric.

FIG. 10 shows another example of a cross-section of an AIMOD. The AIMOD 950 includes a reflective layer 952 positioned above a first electrode 954 that is also an absorbing layer in an optical stack 956, which can include dielectric layers 958 and 960 positioned over and beneath the first electrode 954. The dielectric layer 958 can include more than one layer; likewise, the dielectric layer 960 also can include more than one layer. In some implementations, and in the example illustrated in FIG. 10, the reflective layer 952 can function as a second electrode. In some other implementations, a separate electrode structure may be formed under or over the reflective layer 952. In some implementations, the reflective layer 952 can include aluminum (Al). In some other implementations, different reflective materials may be used.

The optical stack 956 also can include an absorbing layer that is not an electrode, and/or a plurality of other layers. In some implementations, and in the example illustrated in FIG. 10, the first electrode 954 is configured as the absorbing layer. The absorbing layer can be, for example, an approximately 6 nm layer of material that includes MoCr. The reflective layer 952 may be covered with one or more dielectric layers 962 positioned between the reflective layer 952 and the optical stack 956. The function of the dielectric layer 962 is to establish the first null of the standing wave in the cavity about 0-20 nm from the surface of the dielectric layer 962. The dielectric layer 962 is also designed to reduce the separations of the first nulls of different wavelengths for improving the brightness of the white state. The reflective layer 952 can be mounted onto a mechanical layer 964, which is in turn attached to hinges 968. The hinges 968 are in turn connected to posts 966 on either side of the mechanical layer 964. The hinges 968 provide support for the mechanical layer 964, reflective layer 952 and the dielectric layer 962, while still permitting movement of these layers in response to an applied voltage between the first electrode 954 and reflective layer 952, which may serve as a second electrode.

With continuing reference to FIG. 10, the reflective layer 952 can be provided with a charge. The reflective layer is configured to, once charged, move toward the first electrode 954 that is connected to ground. In this manner, the reflective layer 952 can be driven through a range of positions relative to the first electrode 954. For example, FIG. 10 illustrates the reflective layer 952 can be moved to various positions 970, 972, 974, 976 and 978 relative to the first electrode 954.

As discussed with respect to FIG. 9, the AIMOD 950 can be configured to selectively reflect certain wavelengths of light depending on the configuration of the AIMOD. The distance between the first electrode 954, which in this implementations acts as an absorbing layer, and the reflective layer 952 changes the reflective properties of the AIMOD 950. Any particular wavelength can be maximally reflected by controlling the distance between the reflective layer 952 and the absorbing layer first electrode 954. A high percentage of reflection, or a maximum reflection, can occur when the distance is such that the light reflected off the top surface of the reflective layer 952 interferes constructively within the gap between the reflective layer 952 and the absorbing layer. At this distance, the absorbing layer (first electrode 954) is located at the minimum light intensity of the interference standing waves.

For example, the AIMOD 950 of FIG. 10 is designed to be viewed on the substrate 980 side of the AIMOD. Light enters the AIMOD 950 through the substrate 980. Depending on the position of the reflective layer 952, different wavelengths of light are reflected back through the substrate 980, which gives the appearance of different colors. These different colors are also referred to as native colors. A position of a movable layer of a display element (for example, an AIMOD) at a location such that it reflects a certain wavelength or wavelengths can be referred to as a display state. For example, when the reflective layer 952 is in position 970, red wavelengths of light are substantially reflected and other wavelengths of light are substantially absorbed by the first electrode 954 (the absorbing layer). Accordingly, the AIMOD 950 appears red and is said to be in a red state or a red display state. Similarly, the AIMOD 950 is in a green display state (or green state) when the reflective layer 952 moves to position 972, where green wavelengths of light are substantially reflected and other wavelengths of light are substantially absorbed. When the reflective layer 952 moves to position 974, the AIMOD 950 is in a blue display state (or blue state) and blue wavelengths of light are substantially reflected and other wavelengths of light are substantially absorbed. When the reflective layer 952 moves to a position 976, the AIMOD 950 is in a black display state (or black state) and a broad range of wavelengths of light in the visible spectrum are substantially absorbed, and visible reflections are thereby minimized, such that the AIMOD 950 appears "black." When the reflective layer 952 moves to a position 978, the AIMOD 950 is in a white display state (or white state) and a broad range of wavelengths of light in the visible spectrum are substantially reflected such that and the AIMOD 950 appears "white." In some implementations, such as in position 978 which is configured to produce a white state, the distance between the reflective layer 952 and the first electrode 954 can be between about 0 and 20 nm.

In an IMOD display element, the display element's reflective color is determined by the gap spacing between the thin absorbing metal layer and a mirror surface. To produce a white appearance with high brightness, reflections of all wavelengths in the visible spectrum is desired. To achieve high brightness, an optical reflector can be used that includes a metal layer (for example, 952 in FIG. 10) and one or more dielectric layers (for example, 962 in FIG. 10) disposed on the metal layer. In this scheme, the first null of the interference standing wave is found in the cavity near the reflector surface. In the white state, the reflector can be moved in close proximity to the absorber (for example, in the range of 0-20 nm) such that the absorber is located at the null of the standing wave.

Referring to FIG. 9 for clarity of this description, however, a person having ordinary skill in the art will understand that the following description is application to many implementations of electromechanical devices. Whether in the actuated state or in the un-actuated state, a portion of the first electrode 910 and a portion of the movable reflective layer 906 can form a first variable capacitor having a first variable capacitance value. The value of the first variable capacitor can depend on the position of movable reflective layer 906, and in some examples the capacitance can vary between approximately 20 fF and approximately 20 pF. A portion of the second electrode 902 and a portion of the movable reflective layer 906 can form a second variable capacitor having a second variable capacitance value. The value of the second variable capacitor can depend on the position of movable reflective layer 906 and can vary between approximately 20 fF and approximately 20 pF.

Still referring to FIG. 9, the movable reflective layer 906 can be actuated using an electronic driving circuit that creates a potential difference between the first electrode 910 and the movable reflective layer 906 or between the second electrode 902 and the movable reflective layer 906. In various implementations, the potential difference can be created by placing a certain amount of charge on the movable reflective layer 906 and/or on the first and second electrodes 910 and 902. By varying the magnitude of the potential difference, the movable reflective layer 906 can be actuated to move to numerous positions between the first and second conducting layers 910 and 902 (for example, positions 930, 932, 934 and 936) each position causing the device to change its optical response.

Since, the optical property exhibited by the AIMOD 900 varies based on the position of the movable reflective layer 906, precise positioning of the movable reflective layer 906 is desirable. Precise positioning of the movable reflective layer 906 can be advantageous to provide for consistency of displayed color in a display device including a plurality of AIMODs. Precise positioning of the movable reflective layer 906 also can be advantageous in reducing the device complexity. For example, to resolve an ambiguity in the position of the movable reflective layer 906, the device can be provided with at least one sensing node that is patterned or buffered. If the electronic drive circuit can precisely position the movable reflective layer 906, the sensing node may not be included, thus reducing the complexity of the device layout.

Various driving components and schemes have been developed to actuate the movable reflective layer 906. For example, in some implementations, the driving components and schemes discussed above with reference to FIGS. 2 and 3 can be used to actuate the movable reflective layer 906 of the AIMOD 900. Implementations of an electronic driving circuit configured to actuate an AIMOD (for example, AIMOD 900) described herein include a charge injection circuit that is configured to isolate a single AIMOD (for example, AIMOD 900) and transfer a desired amount of charge to the isolated AIMOD such that the reflective membrane is moved to the position that produces the desired optical effect.

Driving the AIMOD 900 by providing (or injecting) a certain amount of electric charge to the movable reflective layer 906, the first electrode 910 or the second electrode 902 is desirable since the electro-mechanics of the movement of the movable reflective layer 906 is predictable if its operating conditions are known, or controlled. Accordingly, by injecting a determined amount of charge the movable reflective layer 906 can be precisely actuated to a desired position such that the AIMOD 900 can produce the desired optical effect.

Figure 11A:
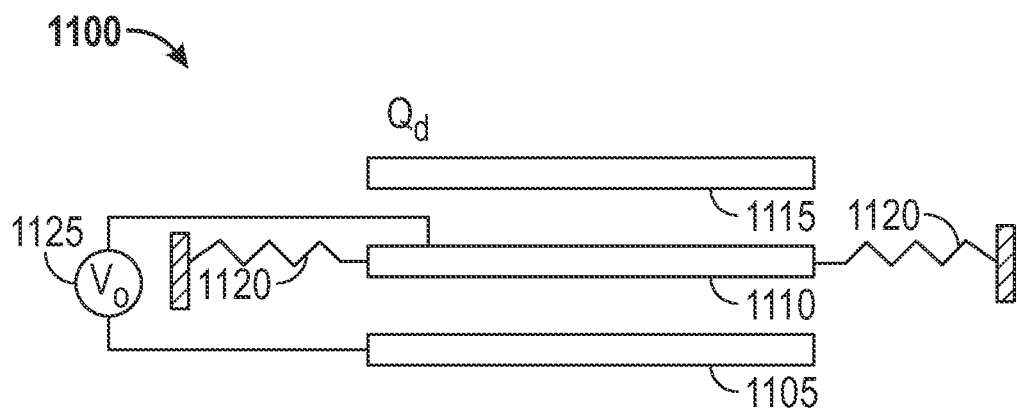
FIGS. 11A and 11B show an example of a three-terminal EMS device with two different voltage biased pull geometries to actuate the device.
Figure 11B:
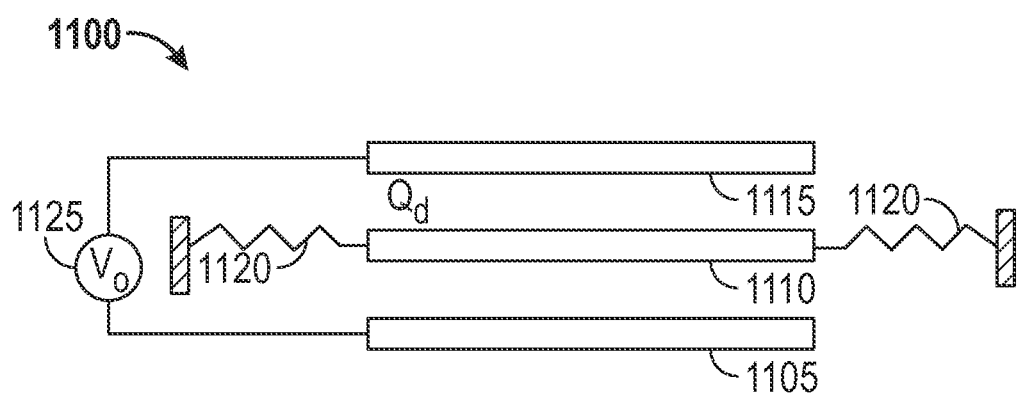

FIGS. 11A and 11B show an example of a three-terminal EMS device with two different voltage biased pull geometries to actuate the device. The three-terminal electromechanical device 1100 includes a first terminal 1105, a second terminal 1115 and a third movable terminal 1110 connected to two springs 1120 having a stiffness K. The springs 1120 can represent the stiffness of the movable terminal 1110. For the purpose of modeling and describing the electro-mechanics of the movement of the movable reflective layer 906, the AIMOD 900 can be represented as the three-terminal EMS device 1100. For example, the first electrode 910 can be represented by the first terminal 1105, the second electrode 902 can be represented by the second terminal 1115 and the movable reflective layer 906 can be represented by the movable third terminal 1110. For the purpose of modeling the AIMOD 900, the movable third terminal 1110 can be considered to have no stiffness and the stiffness K of the springs 1120 can be proportional to the stiffness of the movable reflective layer 906.

FIGS. 11A and 11B illustrate two possible voltage biased pull geometries that actuate the movable third terminal 1110 (or the movable reflective layer 906). The first possible voltage biased pull geometry illustrated in FIG. 11A includes applying a constant bias voltage $V_0$ from a voltage source 1125 across the movable third terminal 1110 and the first terminal 1105 and injecting a charge $Q_d$ on the second terminal 1115. In the first possible voltage biased pull geometry illustrated in FIG. 11A, the position (x) of the movable layer 1110 when actuated by injecting charge $Q_d$ can be determined from the force balance Equation (1):

$$\frac{Q_d^2}{2\varepsilon_0 A_P} - \frac{\varepsilon_0 A_P V_o^2}{2(d_1 + x)^2} - K(x - \Delta x_L) = 0 \quad (1)$$

where d1 is the distance between the first terminal 1105 and the movable third terminal 1110 when the movable third terminal is un-actuated, Ap is the area of the movable third terminal 1110, and $\varepsilon_0$ is the permittivity of vacuum. The quantity $\Delta x_L$, can represent the "launch" bias of the movable reflective layer 906 which can arise due to variations in fabrication and/or environmental conditions.

The relationship between the injected charge $Q_d$ and the position x of the movable third terminal 1110 when actuated can be determined by solving Equation (1) and is given by Equation (2) below:

$$Q_d = \pm \frac{\varepsilon_0 A_P V_0}{(d_1 + x)} \sqrt{1 + \frac{2K(x - \Delta x_L)(d_1 + x)^2}{\varepsilon_0 A_P V_o^2}} \quad (2)$$

The second possible voltage biased pull geometry illustrated in FIG. 11B includes applying a constant bias $V_0$ from a voltage source 1125 across the first terminal 1105 and the second terminal 1115 and injecting a charge $Q_d$ on the movable third terminal 1110. In the second possible voltage biased pull geometry illustrated in FIG. 11B, the position (x) of the movable third terminal 1110 when actuated by injecting charge $Q_d$ can be determined from the force balance Equation (3):

$$\frac{Q_d^2}{2\varepsilon_0 A_P}\left(\frac{d_1 - d_2 + 2x}{d_1 + d_2}\right) - \frac{Q_d V_0}{d_1 + d_2} - K(x - \Delta x_L) = 0 \quad (3)$$

where $d_2$ is the distance between the second terminal 1115 and the movable third terminal 1110 when the movable third terminal 1110 is unactuated.

The relationship between the injected charge $Q_d$ and the position x of the movable layer 1110 when actuated can be determined by solving Equation (3) and is given by Equation (4):

$$x = \frac{\frac{Q_d^2}{2\varepsilon_0 A_P}\left(\frac{d_1 - d_2}{d_1 + d_2}\right) - \frac{Q_d V_0}{d_1 + d_2} + K\Delta x_L}{K - \frac{Q_d^2}{2\varepsilon_0 A_P(d_1 + d_2)}} \quad (4)$$

Figure 12A:
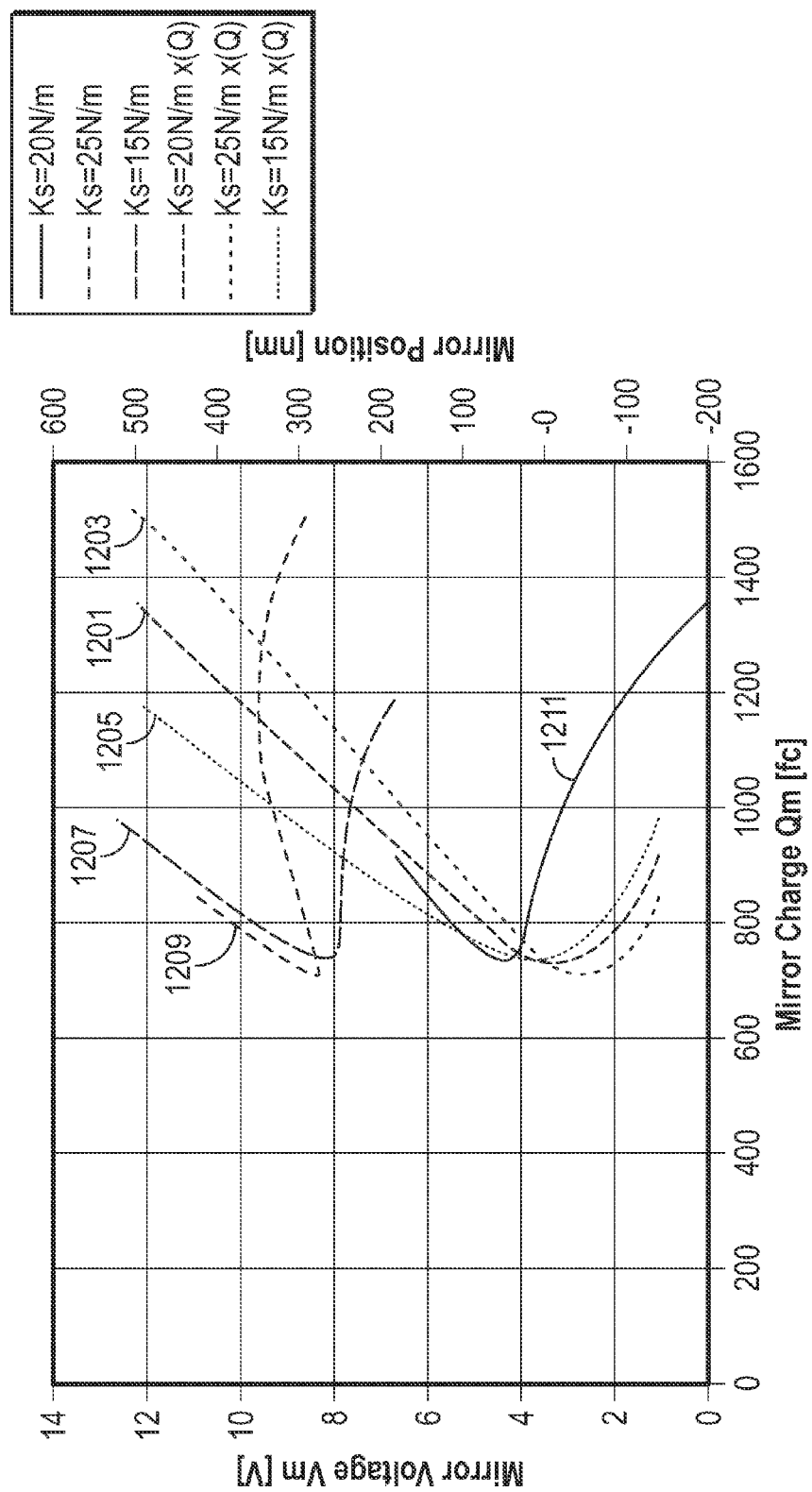
FIGS. 12A-12C show response curves for the different voltage biased pull geometries illustrated in FIGS. 11A and 11B.
Figure 12B:
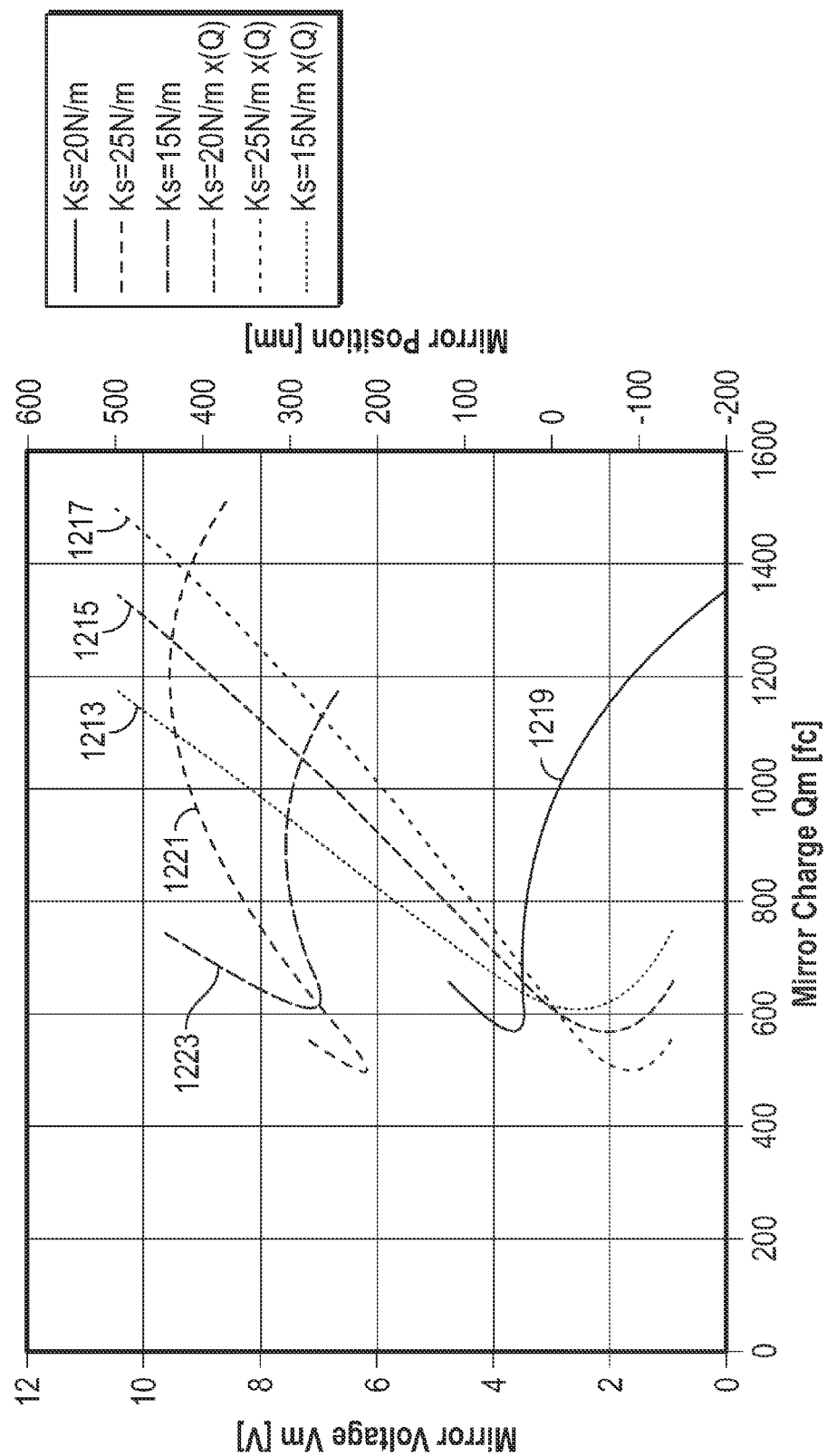
Figure 12C:
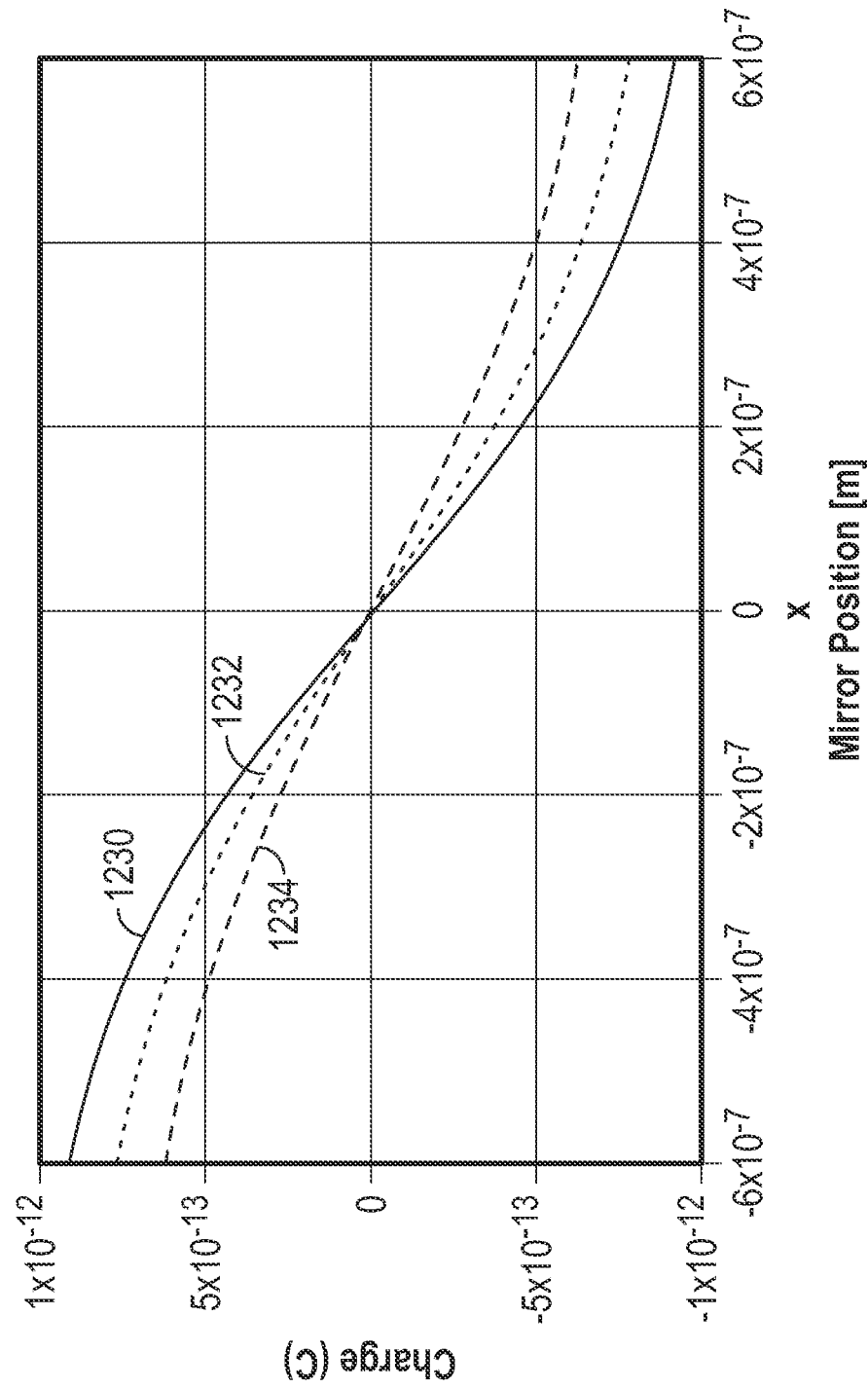

FIGS. 12A-12C show response curves for the different voltage biased pull geometries illustrated in FIGS. 11A and 11B. FIG. 12A is the response curve for the voltage biased pull geometry illustrated in FIG. 11A. Curves 1201, 1203 and 1205, represented by dotted lines, indicate the variation in the position x of the movable third terminal 1110, plotted on the right vertical axis, as a function of the injected charge $Q_d$. For a given injected charge $Q_d$, the position (x) of the movable third terminal 1110 is calculated using the Equation (2) above and the following parameters: $\Delta x_L = 0$, $d_2 = 500$ nm, $d_1 = 420$ nm, $V_0 = 3$ V and Ap=10000 $\mu m^2$. Curve 1201 is obtained by using a value of 20 N/m for the stiffness K in Equation 2. Curve 1203 is obtained by using a value of 25 N/m for the stiffness K in Equation 2 and Curve 1205 is obtained by using a value of 15 N/m for the stiffness K in Equation 2. It is observed from curves 1201, 1203 and 1205 that the position x of the movable third terminal 1115 varies non-linearly with the injected charge $Q_d$ in the region between approximately x=0 nm and approximately x=140 nm but varies linearly with the injected charge $Q_d$ beyond approximately x=140 nm and injected charge greater than about 1000 C. In implementations where the three-terminal EMS device represents the AIMOD 900 which forms a display pixel or a part of a display pixel, the non-linear region of the curves 1201, 1203 and 1205 can be attributed to the snap-down from the off state or the black state (at x=~0 nm) to the on state or the white state (at x=~140 nm).

Curves 1207, 1209 and 1211, represented by solid lines, indicate the variation of the voltage on the terminal on which charge is injected (the second terminal 1115 for the geometry illustrated in FIG. 11A), plotted on the left vertical axis, as a function of the injected charge $Q_d$. The voltage on the second terminal 1115 can be obtained from the relationship $V=Q_d/C$, where C is the capacitance between the second terminal 1115 and the movable third terminal 1110. The capacitance C between the second terminal 1115 and the movable third terminal 1110 can be calculated by assuming that the second terminal 1115 and the movable third terminal 1110 form a parallel plate capacitor separated by a distance $d_2+x$. Curve 1207 is obtained by using a value of 15 N/m for the stiffness K in Equation 2. Curve 1209 is obtained by using a value of 25 N/m for the stiffness K in Equation 2 and Curve 1211 is obtained by using a value of 20 N/m for the stiffness K in Equation 2.

FIG. 12B is also the response curve for the voltage biased pull geometry illustrated in FIG. 11A. The difference between FIG. 12A and FIG. 12B is that a bias voltage ($V_0$) of 2.5V is used to calculate the position of the movable third terminal 1110 in response to the injected charge. Curves 1213, 1215 and 1217, represented by dotted lines, indicate the variation in the position x of the movable third terminal 1110, plotted on the right vertical axis, as a function of the injected charge $Q_d$. Curve 1213 is obtained by using a value of 15 N/m for the stiffness K in Equation 2. Curve 1215 is obtained by using a value of 20 N/m for the stiffness K in Equation 2 and Curve 1217 is obtained by using a value of 25 N/m for the stiffness K in Equation 2. It is observed from FIG. 12B that the position x of the movable third terminal 1110 varies linearly with respect to the injected charge when the position x is greater than approximately 100 nm and/or the injected charge is greater than approximately 800 C. Curves 1219, 1221 and 1223, represented by solid lines, indicate the variation of the voltage on the second terminal 1115, plotted on the left vertical axis, as a function of the injected charge $Q_d$. Curve 1219 is obtained by using a value of 20 N/m for the stiffness K in Equation 2. Curve 1221 is obtained by using a value of 25 N/m for the stiffness K in Equation 2 and Curve 1223 is obtained by using a value of 15 N/m for the stiffness K in Equation 2.

FIG. 12C is the response curve for the voltage biased pull geometry illustrated in FIG. 11B. Curves 1230, 1232 and 1234 indicate the variation in the position x of the movable third terminal 1110 as a function of the injected charge $Q_d$ for different spring constants. For a given injected charge $Q_d$, the position (x) of the movable third terminal 1110 is calculated using the Equation (4) above and the following parameters: $\Delta x_L=0$, $d_2=500$ nm, $d_1=500$ nm, $V_0=10$V and Ap=10000 $\mu m^2$. In various implementations, $\Delta x_L$ can have a value between 0 and ±100 nm, $d_1$ and $d_2$ each can have a value between 100 nm and 1000 nm, $V_0$ can have a value between 2-20 V and Ap can have a value between 1000-20000 $\mu m^2$. Curve 1230 is obtained by using a value of 25 N/m for the stiffness K in Equation 2. Curve 1232 is obtained by using a value of 20 N/m for the stiffness K in Equation 2 and Curve 1234 is obtained by using a value of 15 N/m for the stiffness K in Equation 2. It is observed from FIG. 12C that the variation of the position x of the movable third terminal with respect to the injected charge is more non-linear in the second possible voltage biased pull geometry illustrated in FIG. 11B as compared to the first possible voltage biased pull geometry illustrated in FIG. 11A. Since the variation of the position x on the amount of charge injected using the voltage biased pull geometry illustrated in FIG. 11A is more linear, in various implementations it may be more desirable to use the voltage biased pull geometry illustrated in FIG. 11A to position the movable third terminal 1110 (or the movable reflective layer 906) precisely and without any ambiguity. Additionally, in the voltage bias pull geometry illustrated in FIG. 11B, the bias voltage between the first terminal 1105 and the second terminal 1115 can produce an electric field that can interact with the charges placed on the movable third terminal 1110. Thus, determining the amount of charge to inject that can result in a precise positioning of the movable third terminal 1110 in the voltage biased pull geometry illustrated in FIG. 11B can be more complicated since the amount of charge injected into the device that would actuate the movable third terminal 1110 to the desired position can be a function of the external charge input as well as the current position of the movable third terminal 1110 and the voltage bias.

Figure 13A:
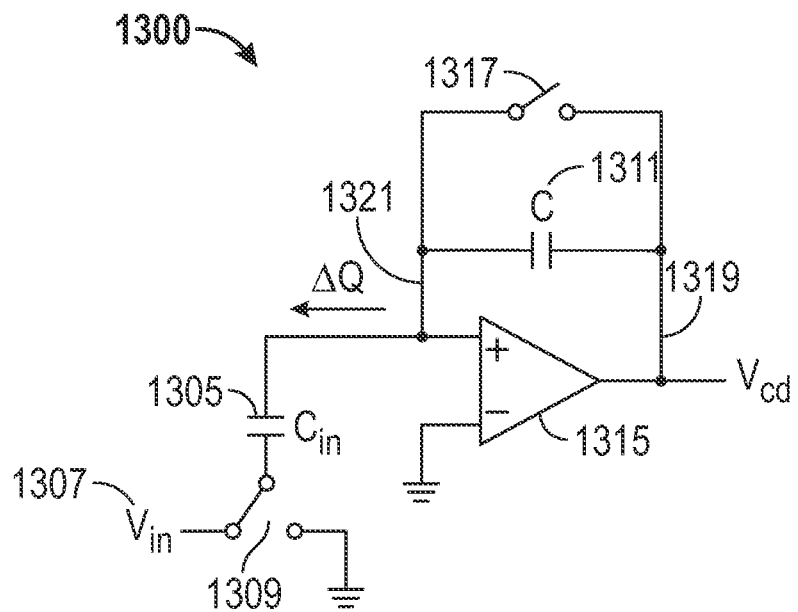
FIG. 13A shows an example of a switched capacitor charge injection circuit that can inject charge into an electromechanical device (for example, an AIMOD or a capacitive device).

FIG. 13A shows an example of a switched capacitor charge injection circuit that can inject charge into an electromechanical device (for example, an AIMOD or a capacitive device). The charge injection circuit 1300 includes an input capacitor 1305 having a capacitance $C_{in}$ connected to a voltage source 1307 through a switch 1309. The injection circuit further includes an operational amplifier 1315 and a capacitor 1311 having a capacitance C and a switch 1317 that are placed in the feedback path of the operational amplifier 1315. The capacitor 1311 is connected between the output line 1319 of the operational amplifier 1315 and the inverting line 1321 of the operational amplifier 1315. Initially, the input capacitor 1305 is pre-charged to an input charge value $\Delta Q$ by connecting the input capacitor 1305 to the voltage source 1307 that provides a voltage $V_{in}$. The switch 1317 in the feedback path of the operational amplifier 1315 is closed to close the feedback loop and drive the potential at the inverting terminal connected to the inverting line 1321 to ground and thus stabilize the operational amplifier 1315. Subsequently, when the switch 1317 is opened and the switch 1309 is toggled such that one terminal of the input capacitor 1305 is connected to the ground, an amount of charge from the input capacitor 1305 is transferred to the capacitor 1311 in the feedback path of the operational amplifier 1315. In some implementations, the entire charge $\Delta Q$ is transferred from the input capacitor 1305 to the capacitor 1311. The charge transferred to the capacitor 1311 in this manner can be precise and tolerant to parasitic capacitances and resistances at both ends of the capacitor 1311. In various implementations, the charge injection can be sensitive to a direct shunting capacitance across the capacitor 1311. Since, the charge injected into the capacitor 1311 using the switched capacitor charge injection circuit 1300 can be precise and tolerant to parasitic capacitances and resistances, the basic principle of the charge injection circuit 1300 can be used to inject charge into the AIMOD 900 or the three-terminal electromechanical device 1100 to precisely position the movable reflective layer 906 or the movable third terminal 1110 to a desired position.

Figure 13B:
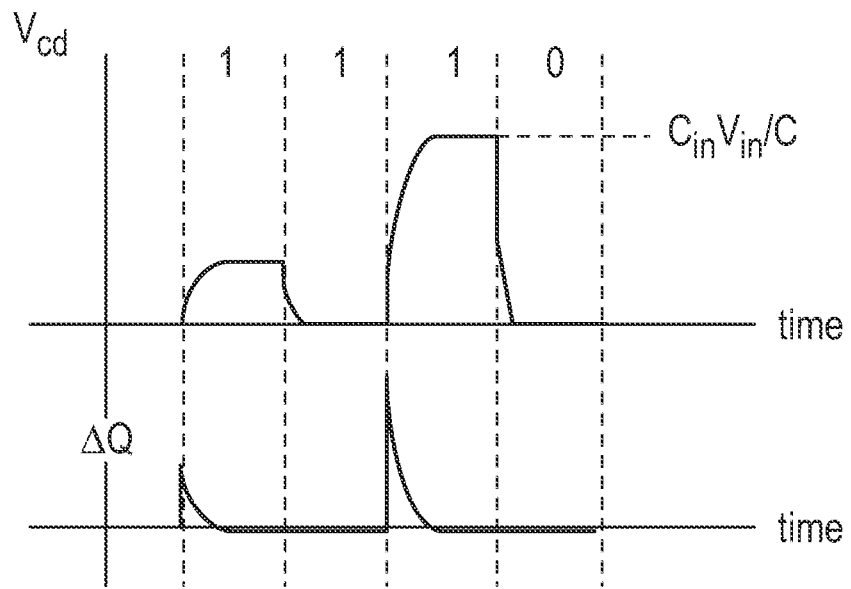
FIG. 13B shows an example variation of the input charge $\Delta Q$ and the output voltage $V_{cd}$ of an operational amplifier included in the charge injection circuit illustrated in FIG. 13A as a function of time.

FIG. 13B shows an example variation of the input charge $\Delta Q$ and the output voltage $V_{cd}$ of the operational amplifier included in the charge injection circuit illustrated in FIG. 13A as a function of time. As shown in FIG. 13B when the charge is transferred from the input capacitor 1305 to the capacitor 1311, the output voltage $V_{cd}$ can be proportional to $(C_{in} \times V_{in})/C$.

Figure 14A:
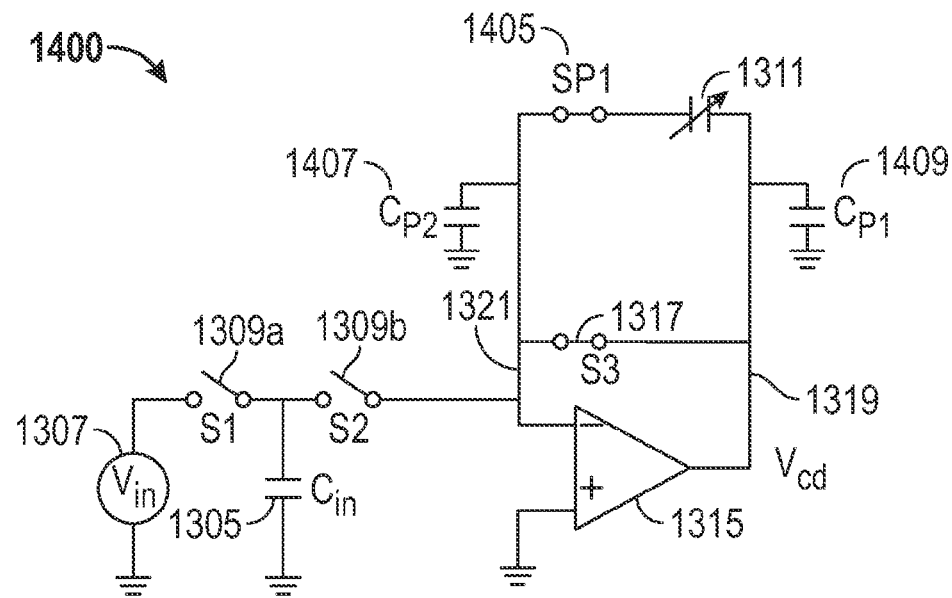
FIGS. 14A-14C show another example of a switched capacitor charge injection circuit and the different states through which the charge injection circuit injects charge into a device.
Figure 14B:
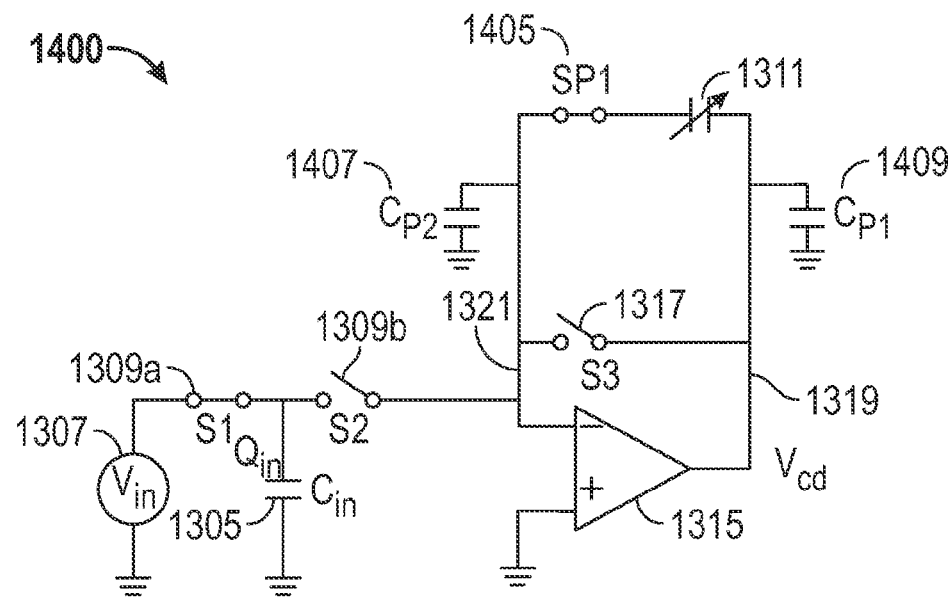
Figure 14C:
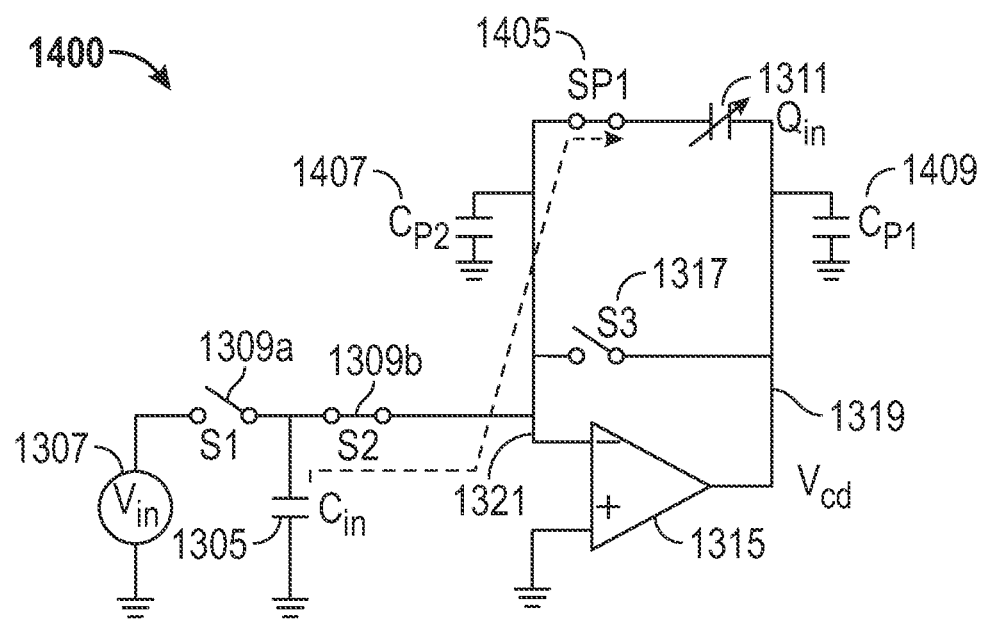

FIGS. 14A-14C show another example of a switched capacitor charge injection circuit and the different states through which the charge injection circuit injects charge into a device. The charge injection 1400 is similar to the charge injection circuit 1300 described above, except for the following differences. The three-way switch 1309 in the circuit 1300 is replaced by two switches 1309a and 1309b in the circuit 1400, a row-select switch 1405 is connected in series with the capacitor 1311 and parasitic capacitors 1407 and 1409 are included in the circuit 1400. The capacitor 1311 can be a portion of an EMS device. For example, in various implementations, the capacitor 1311 can be the first or second variable capacitor of the AIMOD 900. In various implementations, the capacitor 1311 can be the capacitor formed between the first terminal 1105 and the movable third terminal 1110 or the capacitor formed between the second terminal 1115 and the movable third terminal 1110. In various implementations, the capacitor 1311 can be a capacitive EMS device.

FIG. 14A illustrates a first state of the switched capacitor charge injection circuit 1400, where the switch 1317 is closed to reset the circuit 1400 and the operational amplifier 1315. When the switch 1317 is closed, the capacitor 1311 can be set to a desired charge level or discharged. The switches 1309a and 1309b are open in this state while the row-select switch 1405 is closed. FIG. 14B illustrates a second state of the switched capacitor charge injection circuit 1400, where the switch 1309a is closed to charge the input capacitor 1305 while switch 1309b and switch 1317 are open. Row-select switch 1405 remains closed in this state. FIG. 14C illustrates a third state of the switched capacitor charge injection circuit 1400, where switch 1309b is closed while switch 1309a is open such that charge Qin from the input capacitor 1305 is transferred to the capacitor 1311 as shown in FIG. 14C. Row-select switch 1405 remains closed and the switch 1317 remains open.

Figure 15A:
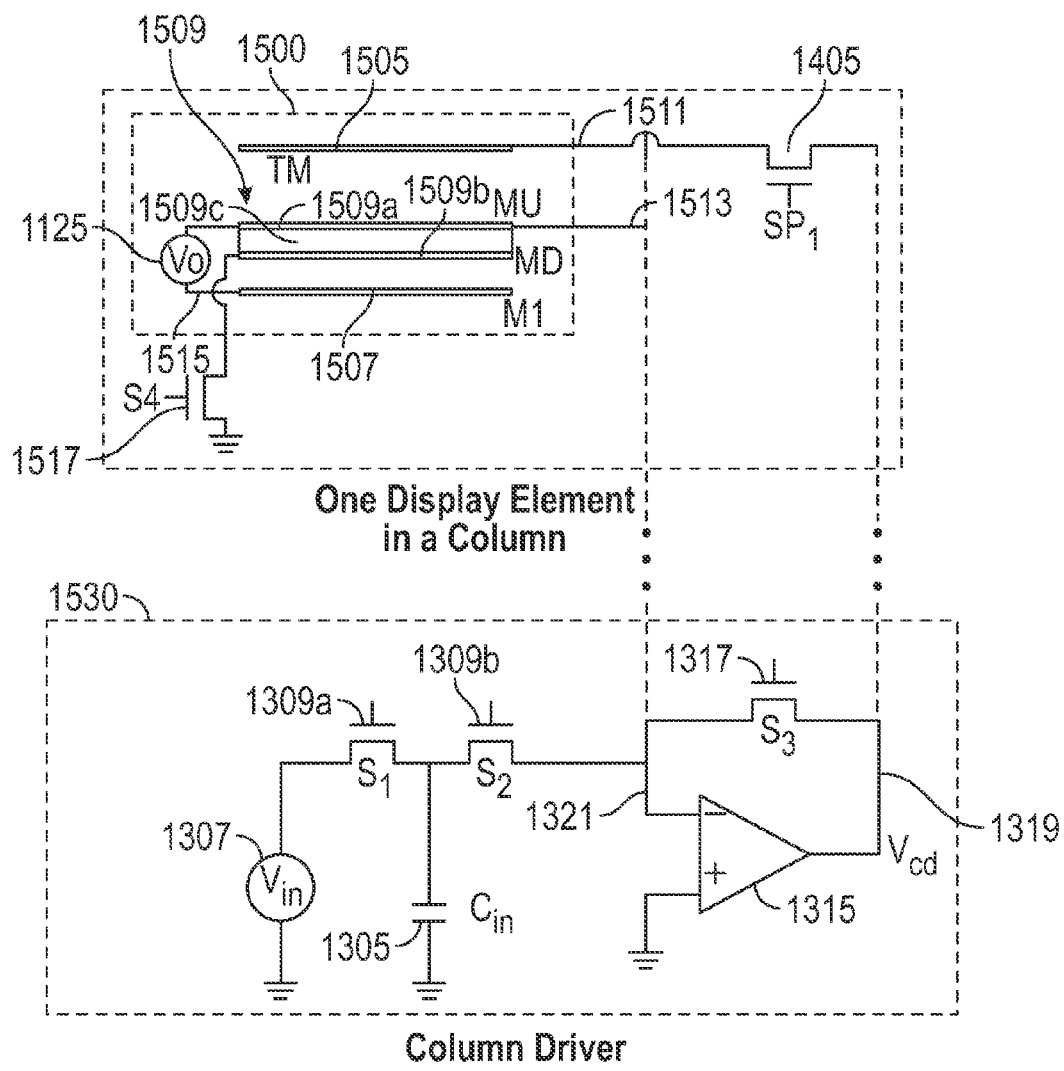
FIG. 15A shows an example schematic of a display element driven by a charge injection circuit.

FIG. 15A shows an example schematic of a display element driven by one example of a charge injection circuit. The display element 1500 can be a portion of a display device having an array of display elements arranged in a plurality of rows and columns. Each display element includes a first stationary electrode 1505 attached to a first drive line 1511, a movable electrode 1509 attached to a second drive line 1513 and a second stationary electrode 1507 attached to a third drive line 1515. The first stationary electrode 1505, the second stationary electrode 1507 and the movable electrode 1509 can be at least partially reflective. The movable electrode 1509 can include a first conducting surface 1509a facing (opposite or proximate to) the first stationary electrode 1505 and a second conducting surface 1509b facing (opposite or proximate to) the second stationary electrode 1507. A layer of dielectric material 1509c can be included between the first and second conducting surfaces 1509a and 1509b. The first stationary electrode 1505 and the first conducting surface 1509a may form a variable capacitor whose capacitance varies as the position of the movable electrode 1509 varies. Similarly the second stationary electrode 1507 and the second conducting surface 1509b may form a variable capacitor. The layer of dielectric material 1509c may be effective in insulating the two variable capacitors.

In various implementations, the display element 1500 can include the AIMOD 900 described above. In such implementations, the first stationary electrode 1505 can be similar to the second electrode 902, the second stationary electrode 1507 can be similar to the first electrode 910 and the movable electrode 1509 can be similar to the movable reflective layer 906. In various implementations, the display element 1500 can include the three-terminal EMS device 1100 described above.

The movable electrode 1509 of the display element 1500 can be actuated using the first possible voltage biased pull geometry illustrated in FIG. 11A. In this geometry, the movable electrode 1509 is actuated by injecting a charge of a certain magnitude on the first stationary electrode 1505 and applying a bias voltage between the movable electrode 1509 and the second stationary electrode 1507. In the implementation illustrate in FIG. 15A, a voltage source 1125 is connected to the third drive line 1515 and provides a potential difference between the first conducting surface 1509a of the movable electrode 1509 and the second stationary electrode 1507. In some other implementations, the voltage source 1125 can be connected between the second conducting surface 1509b and the second stationary electrode 1507. In the illustrated implementation, the second conducting surface 1509b is connected to the ground by a global reset switch 1517.

The charge injection circuit 1530 is connected to the display element 1500 such that the output line 1319 of the operational amplifier 1315 is electrically coupled to first drive line 1511 of the display element 1500 via the row-select switch 1405. The inverting line 1321 of the operational amplifier 1500 is connected to the drive line 1513 of the display element 1500. As described above, to transfer charge to the stationary electrode 1505, the circuit is stabilized by closing switch 1317 and keeping the switches 1309a and 1309b open. The input capacitor 1305 is pre-charged by connecting the input capacitor 1305 to the voltage source 1307 by closing the switch 1309a while switches 1309b and 1317 are kept open. After the capacitor 1305 is pre-charged, a desired amount of charge is transferred to the stationary electrode 1505 by opening the switch 1309a and closing switch 1309b. Switch 1317 is kept open during this time. The row-select switch 1405 is kept closed through the entire process. Closing the switch 1405 places the display element 1500 in the feedback path of the operational amplifier 1315. When the display element 1500 is placed in the feedback path of the operational amplifier 1315, the conducting surface 1509a of the movable electrode 1509 is placed at virtual ground and charge is transferred from the capacitor 1305 to the first stationary electrode 1505. When charge is transferred to the first stationary electrode 1505, mirror charges will appear on the first conducting surface 1509a. In various implementations, the charge injection circuit can be configured to transfer approximately 10 pC of charge in about 10 µs. In various implementations, the input capacitor 1305 can have a capacitance $C_{in}$ in the range from about 20 fF to about 20 pF. In various implementations, the voltage source 1307 may be configured to provide a voltage $V_{in}$ in the range from about 1V to about 40V. In various implementations, the bias voltage $V_0$ can vary between approximately 1V and approximately 40V. In various implementations, the switched capacitor charge injection circuit 1530 may be configured to displace the movable electrode 1509 in the range of approximately 10 nm to about 1000 nm from its equilibrium position.

The row-select switch 1405 is useful to select a display element from among a plurality of display elements arranged in a row. To clarify the function of the row-select switch 1405, consider a display device including a plurality of display elements that are arranged in multiple rows and columns. Each column can be provided with the charge injection circuit 1530 (also referred to as a column driver). The charge injection circuit 1530 includes all the components of the charge injection circuit 1400 except for the row-select switch 1405. Each row of the display device is provided with a row-select switch 1405. The row-select switch 1405 provided to the $i^{th}$ is referred to herein as SPi. In the illustrated implementation only the first switch 1405 (SP1) is shown. To transfer charge to the display element in the ith row, the corresponding row-select switch SPi is closed while the remaining row-select switches are open. This allows connection of the column driver 1530 to only one display element in a row at any one time. Accordingly, by virtue of row selection switches (SPi), at any one time the charge from the input capacitor 1305 is injected into only the selected display element and not the other display elements attached to the column. Thus, the column driver 1530 can actuate each display element in the plurality of rows one at a time. By providing row-select switches SPi, a plurality of display elements in a column can be driven by a single column driver which switchably connects to a single display element in a row at one time. Thus, the drive circuit layout can be simplified and a footprint of the drive circuit can be reduced.

In various implementations, the column driver 1530 can be implemented on a high voltage CMOS platform such that the switches 1309a, 1309b and 1317 are high isolation and low-leakage devices. In various implementations the switches 1309a, 1309b, 1317, 1405 and 1517 can be bi-polar junction transistors, field effect transistors or other semiconductor switches.

Figure 15B:
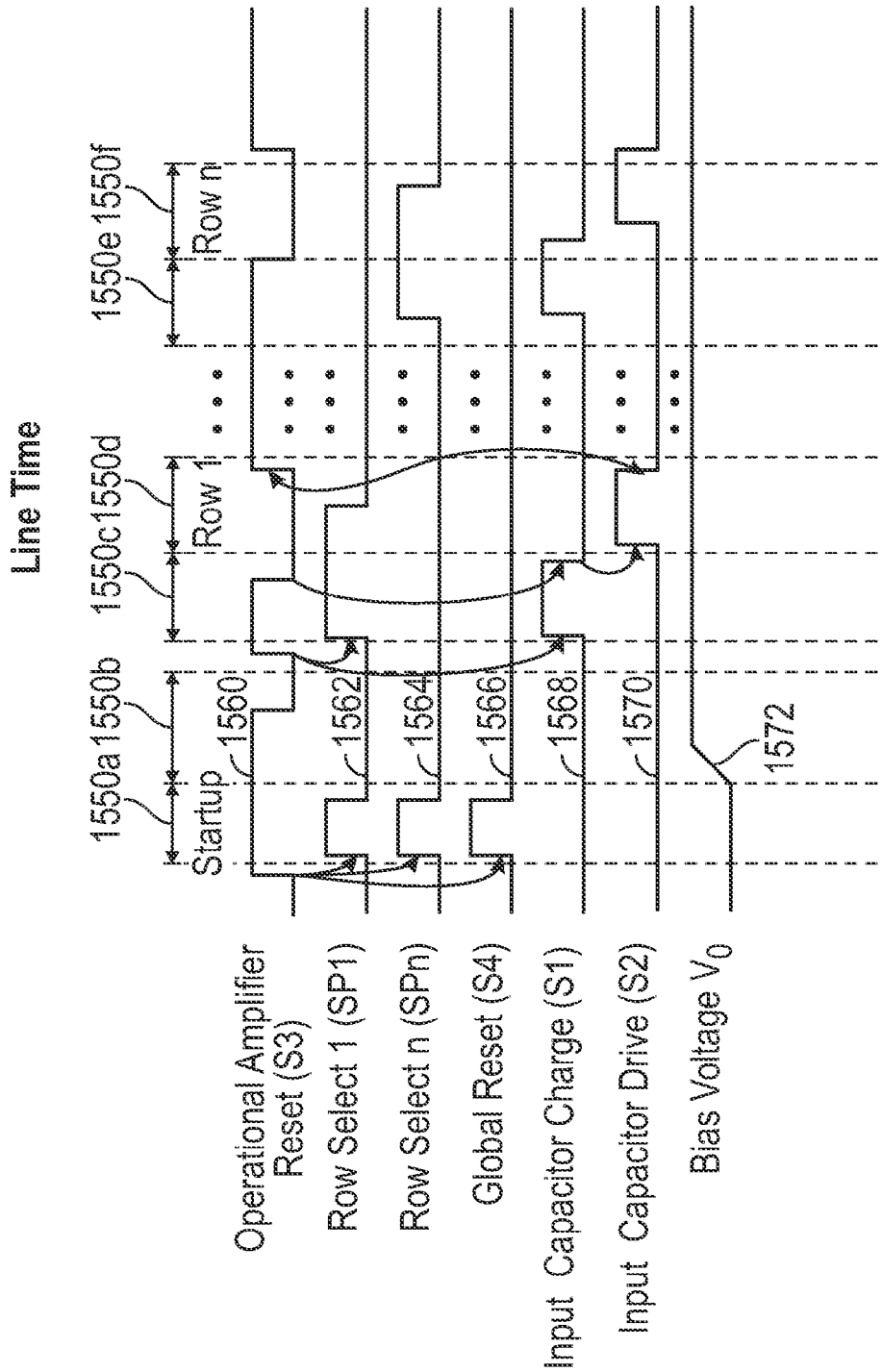
FIG. 15B shows an example of a timing diagram for the implementation depicted in FIG. 15A.

FIG. 15B shows an example of a timing diagram for the implementation depicted in FIG. 15A. Line 1560 illustrates the timing diagram for the operational amplifier reset switch 1317. Line 1562 illustrates the timing diagram for the row-select switch 1405 associated with the display element 1500 in row 1. Line 1564 illustrates the timing diagram for the row-select switch 1405 associated with the display element 1500 in row n. Line 1566 illustrates the timing diagram for the global reset switch 1517 provided to each display element 1500 in a row. Line 1568 illustrates the timing diagram for the switch 1309a that is configured to charge the input capacitor 1305. Line 1570 illustrates the timing diagram for the switch 1309b that is configured to transfer charge from the input capacitor 1305 to the display element 1500. Line 1572 illustrates the profile of the bias voltage $V_0$ provided by the voltage source 1125 as a function of time.

During the first line time 1550a the operational amplifier 1315 is reset by closing the switch 1317. In various implementations, the switch 1317 can be closed by providing a voltage signal. In various implementations, the switch 1317 can be closed and maintained in the closed position by applying a voltage signal that has a magnitude corresponding to the voltage high of a CMOS circuit (for example, in some CMOS platforms the voltage high can correspond to about 5V). During the first line time 1550a the plurality of display elements are also reset by providing closing the associated row-select switch SPi (for example, SP1). For example, the display element 1500 can be reset by closing the row-select switch 1405. As discussed above, each row-select SPi can be closed by providing a voltage. Resetting the display elements also includes grounding the movable electrode of each display element. For example, the second conducting surface 1509b of the movable electrode 1509 of the display element 1500 is connected to the ground by closing the global reset switch 1517. During line time 1550b, the row-select switches SPi and the global reset switch connecting the movable electrode of each display element to the ground are opened. The switches can be opened by turning the provided voltage to '0' or by applying a voltage that corresponds to the voltage low of a CMOS circuit. During the line time 1550b, the voltage source 1125 is turned on such that the voltage output by the voltage source 1125 can be ramped up to the desired voltage level $V_0$. During line time 1550c, the operational amplifier can be reset again by closing the switch 1317 and the row-select switch 1405 corresponding to the first row is closed. During the line time 1550c the input capacitor 1305 is precharged by connecting the capacitor to the voltage source 1307 by closing the switch 1309a. During line time 1550d, the switch 1317 and the switch 1309a are opened, while switch 1309b is closed such that charge from the input capacitor 1305 is transferred to the selected display element. The procedures described in line time 1550c and 1550d can be repeated for the display element in the subsequent row as indicated in line times 1550e and 1550f.

If the movable electrode 1509 of the selected device does not completely settle down before the subsequent display element in the next row is driven then the capacitance of the variable capacitors formed by the movable electrode 1509 and the first and second electrodes 1505 and 1507 will vary. This variation in the capacitance can inject charges into the inverting line 1321 of the operational amplifier 1315. This injected charge is indistinguishable from the desired charge injected through the input capacitor 1305 and can affect the position of the movable electrode 1509 of the next display element. Various approaches can be adopted to avoid extraneous charge injection from the time varying capacitance of the voltage biased movable electrode. One approach is to provide a bypass capacitor between a common voltage line that connects the movable electrodes of all the display elements in a column to the inverting line 1321 and a common bias rail that is connected to the third drive line 1515 of all the display elements in a column. This approach is discussed in further detail with reference to FIG. 19F. Another approach to reduce the extraneous injection of charge is by transferring charges to the movable electrode over a time scale that is faster than the movable electrode dynamics. For example, in some implementations, the voltage biased movable electrode can be designed to move on a time scale of 100 μs or slower.

The display device including a plurality of display element (for example, display element 1500) can be calibrated during the system start up, for example, at line time 1550a. The calibration process includes injecting a known amount of charge and the expected voltage, for example calculated from Equation (2) above, can be compared against the actual voltage that is developed. By making two such measurements, the possible variations in the spring stiffness and launch condition of the movable electrode 1509 can be determined. These data can be placed in a memory unit local to the driver so that all subsequent addressing of the display device can be properly conditioned to yield a uniform response from the display device. The measurement of the voltage at the output of the operational amplifier 1315 can be divided by the known magnitude of the injected charge to yield the position of the movable electrode 1509 without ambiguity. In some implementations, the voltage at the output of the operational amplifier 1315 and the magnitude of the injected charge can be sent through log amplifiers and subtracted one from the other to yield a logarithmically compressed version of the position of the movable electrode 1509. By suitable readout electronics, it will also be possible to do successive corrections in a way similar to algorithms such as the least mean square (LMS) technique. In this approach, all electrodes are assumed to follow a standard electrode response characteristic and local deviations are corrected in successive frames.

Figure 16:
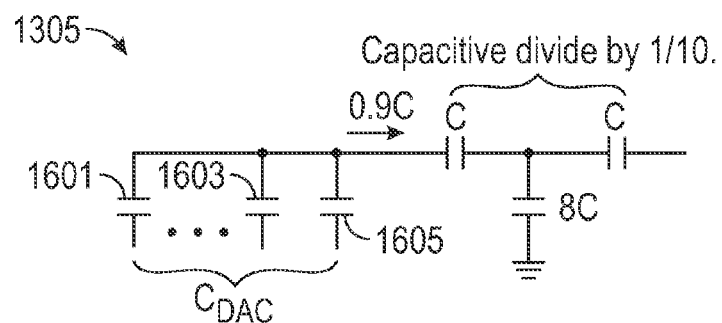
FIG. 16 shows an example of a charge injection circuit in which the input capacitor includes a capacitive stage including a plurality of capacitors and a capacitive divider.

FIG. 16 shows an example of a charge injection circuit in which the input capacitor 1305 includes a capacitive stage including a plurality of capacitors and a capacitive divider. The capacitive stage including a plurality of capacitors 1601, 1603 and 1605 and a capacitive divider can be advantageous in those implementations where the desired capacitance values (coupled to the charge values and the voltage levels to be used) are small and thus may lead to inaccuracies.

Figure 17:
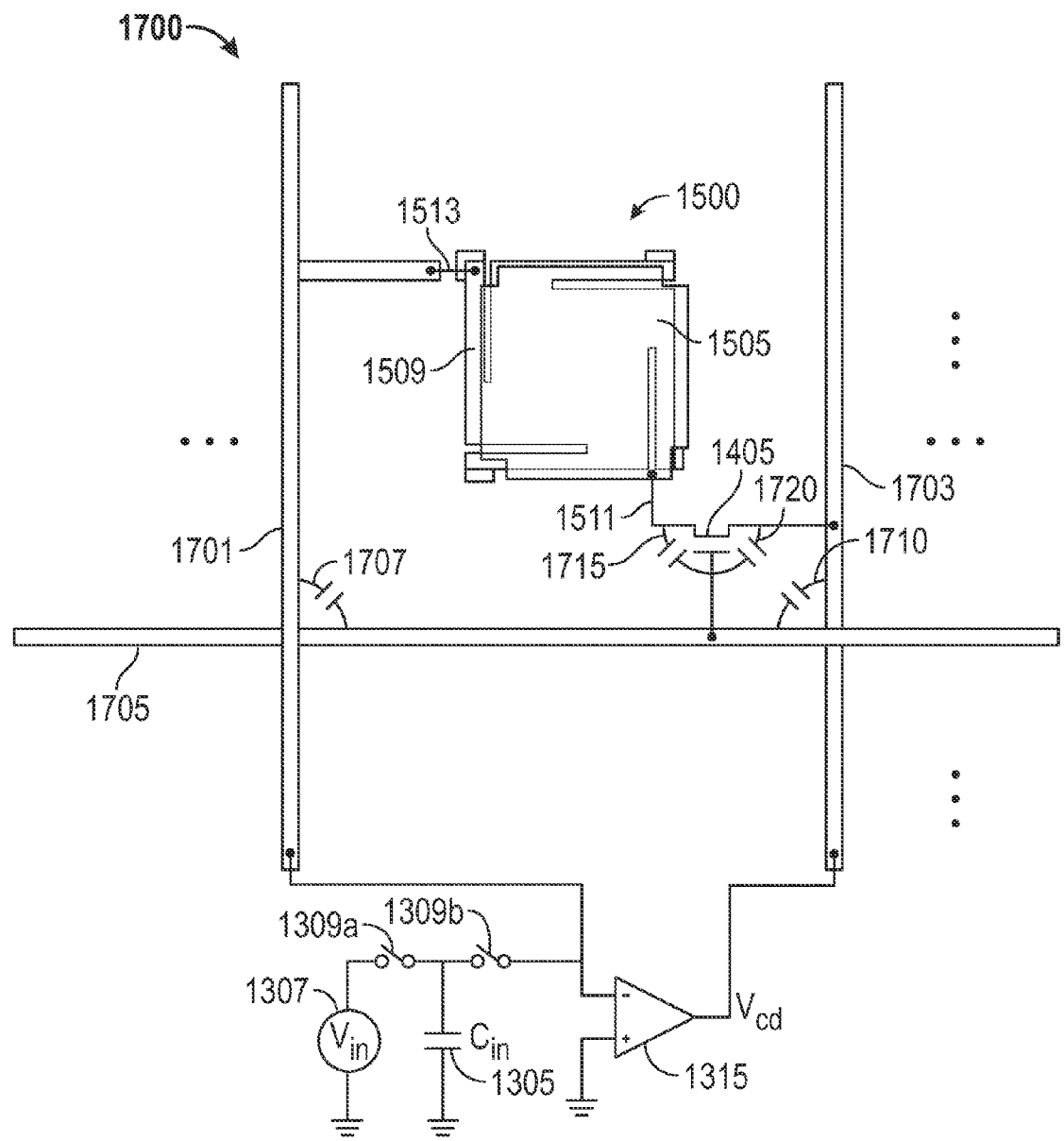
FIG. 17 shows an example layout of the display element depicted in FIG. 15A.

FIG. 17 shows an example layout of the display element depicted in FIG. 15A. FIG. 17 includes capacitors 1707 and 1710 connected between the column electrodes 1701 and 1703 and the row electrode 1705. Capacitors 1715 and 1720 are connected between the terminals of the row-select switch 1405. The charge injection circuit depicted in FIG. 15A can be insensitive to capacitive coupling to ground or other DC voltages. However, the charge injection circuit can be sensitive to direct parasitic capacitances between the negative terminal of the operational amplifier and its output node. The layout in FIG. 17 illustrates that most parasitics terminate on a low impedance path to ground or other low impedance nodes that are held at a biased potential. The only contributions to the direct coupling capacitance is overlap and fringing capacitances present in the display element 1500 itself over structures that are not moving. The contributions to the direct coupling capacitance can be reduced by avoiding direct overlap between the first stationary electrode 1505 and the conducting portions in the non-moving regions of the display element 1500.

Figure 18:
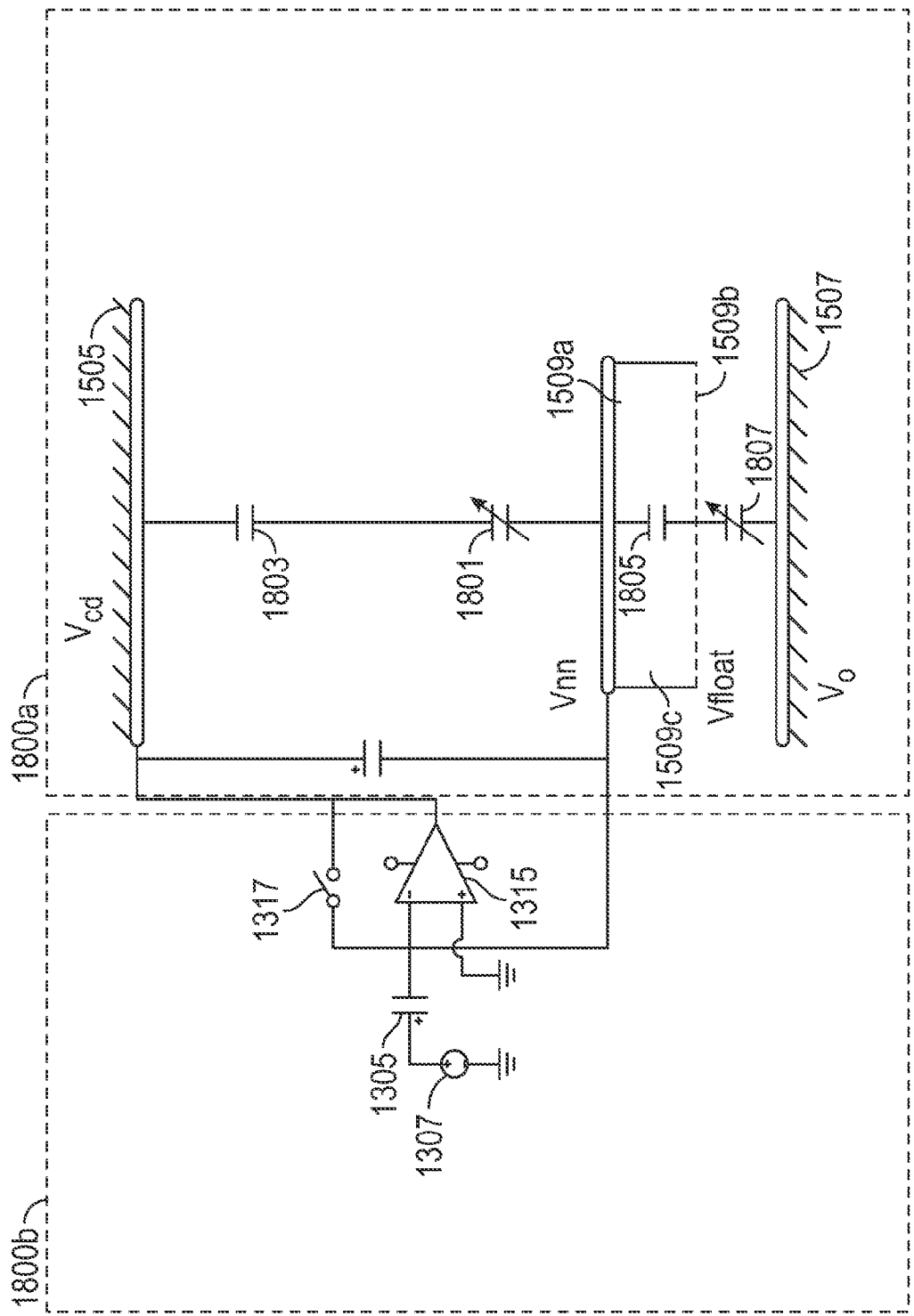
FIG. 18 shows an example of a three-terminal EMS connected to an implementation of the charge injection circuit.

FIG. 18 shows an example of a three-terminal EMS 1800a connected to an implementation of the charge injection circuit 1800b. The three terminal EMS device 1800a depicted in FIG. 18 can be similar to the display element 1500 depicted in FIG. 15A and described above. The charge injection circuit 1800b can be similar to the charge injection circuits 1300, 1400 and 1530 described above. As discussed above, the first stationary electrode 1505 and the first conducting surface 1509a form a first variable capacitor. The first variable capacitor can include a capacitor 1803 having a fixed capacitance and a variable capacitor 1801 having a variable capacitance. The first conducting surface 1509a and the second conducting surface 1509b form a fixed capacitor 1805. The second conducting surface 1509b and the second stationary electrode 1507 form a second variable capacitor 1807. The first stationary electrode 1505 is connected to the output of the operational amplifier 1315 and held at a potential $V_{cd}$. The first conducting surface 1509a of the movable electrode 1509 is connected to the inverting terminal of the operational amplifier 1315 and held at a potential of $V_{nn}$. The second conducting surface 1509b of the movable electrode 1509 is allowed to float at a potential of $V_{float}$ that can vary based on the position of the movable electrode 1509. The second stationary electrode 1507 is held at a potential of $V_0$ corresponding to the bias voltage.

Figure 19A:
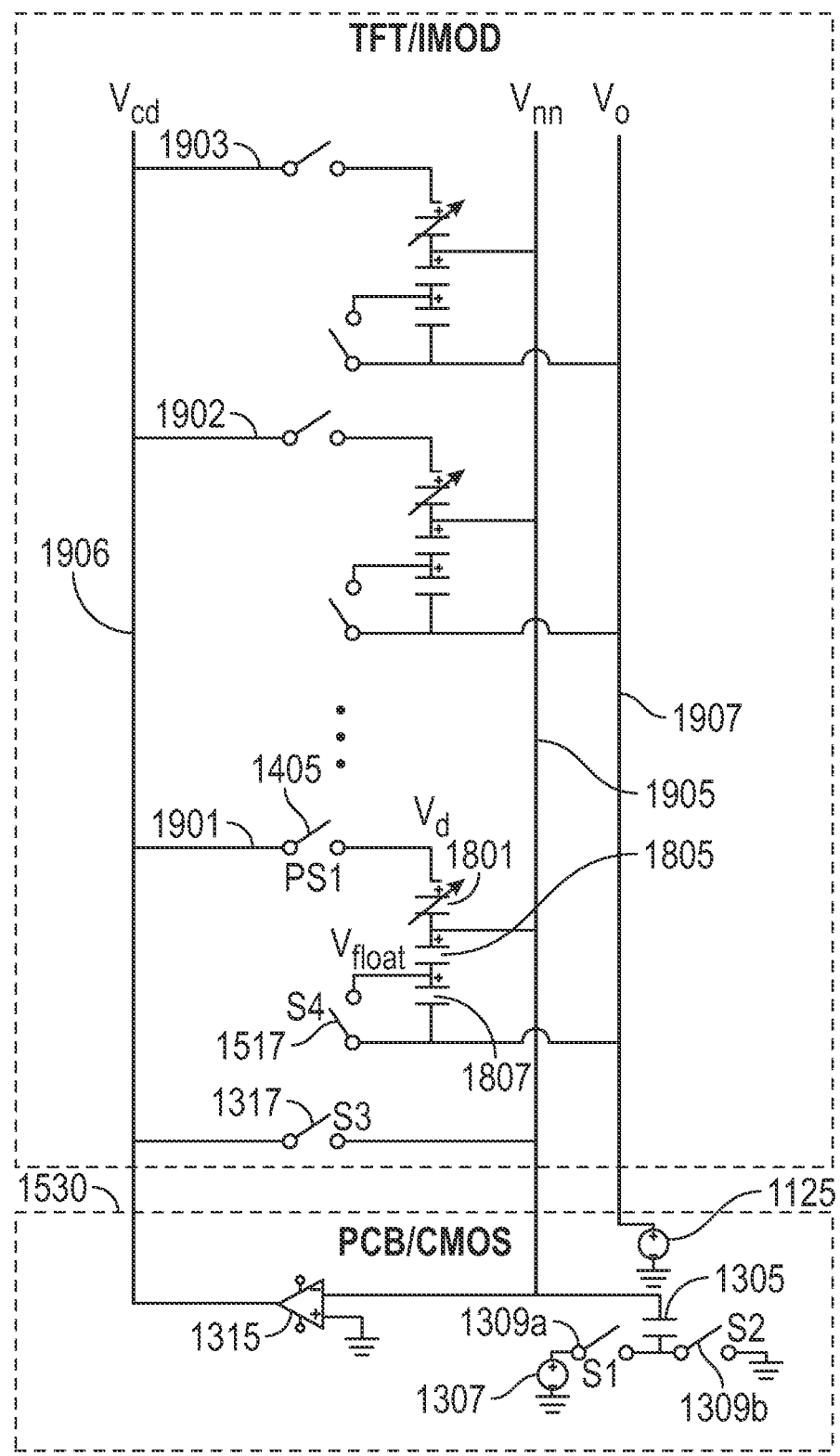
FIGS. 19A-19F show schematic examples of a plurality of three-terminal EMS depicted in FIG. 18 connected to an example of a charge injection circuit.

FIGS. 19A-19F show schematic examples of a plurality of three-terminal EMS depicted in FIG. 18 connected to an example of a charge injection circuit. In various implementations, the charge injection circuit depicted in FIGS. 19A-19F can be similar to the column driver 1530 discussed above. The three-terminal EMS devices are arranged in multiple rows 1901, 1902 and 1903. As illustrated in FIG. 19A, the three-terminal EMS device in each row can be represented by variable capacitors 1801 and 1807 and a fixed capacitor 1805. As discussed above the variable capacitor 1801 is connected between the output and the inverting terminal of the operational amplifier 1315. As illustrated in FIG. 19A, the variable capacitor 1801 of three-terminal EMS device in each row are connected together to a common voltage line 1905 that is connected to the non-inverting terminal of the operational amplifier 1315. The common voltage line 1905 is maintained at a potential $V_{nn}$. In various implementations, the potential $V_{nn}$ can be close to the ground such that the conducting surface 1509a of the movable electrode 1509 is a virtual ground. The variable capacitor 1807 is connected to a bias line 1907 which is connected to the bias voltage source 1125 and maintained at a potential $V_0$.

Figure 19B:
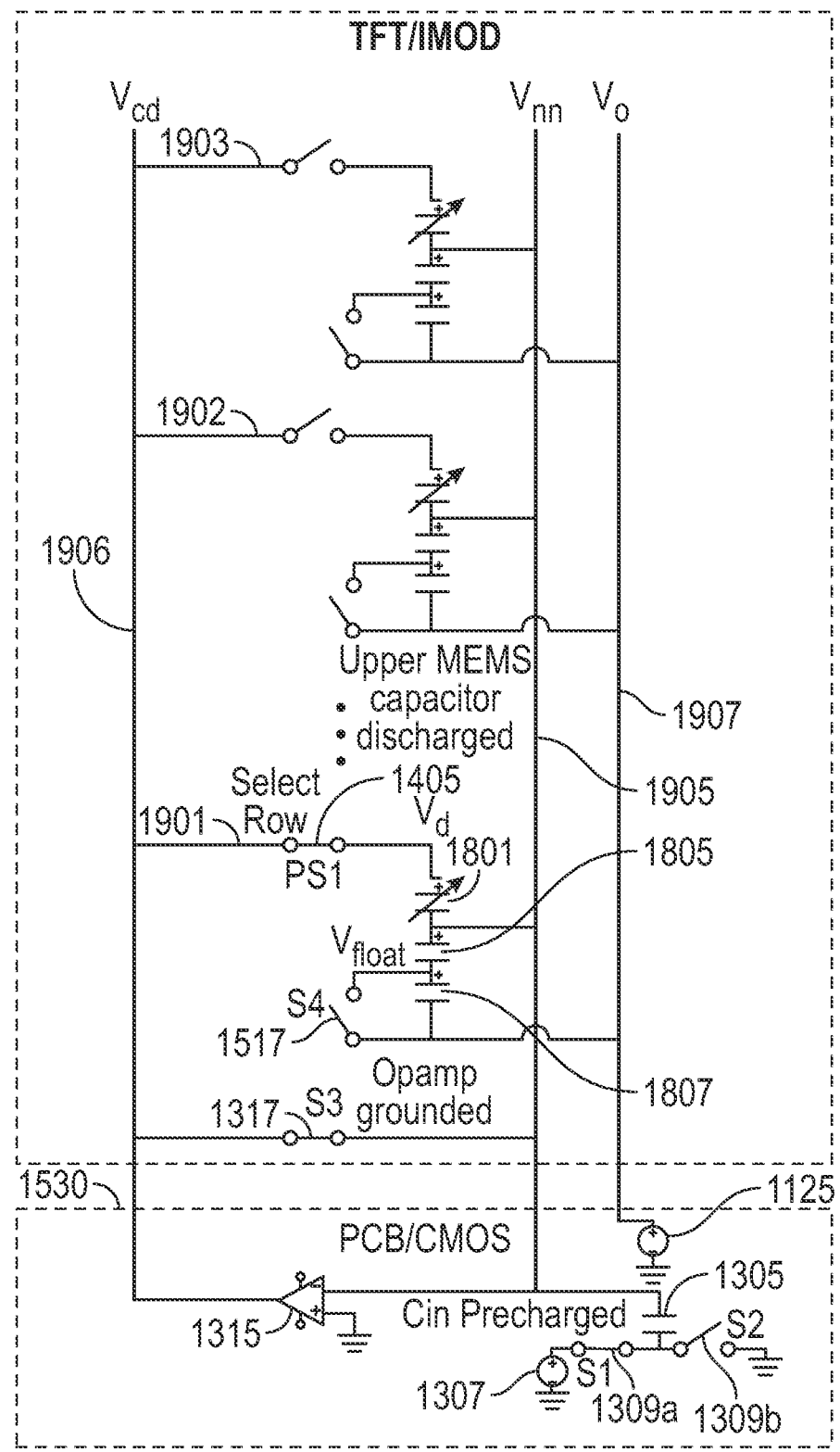
Figure 19C:
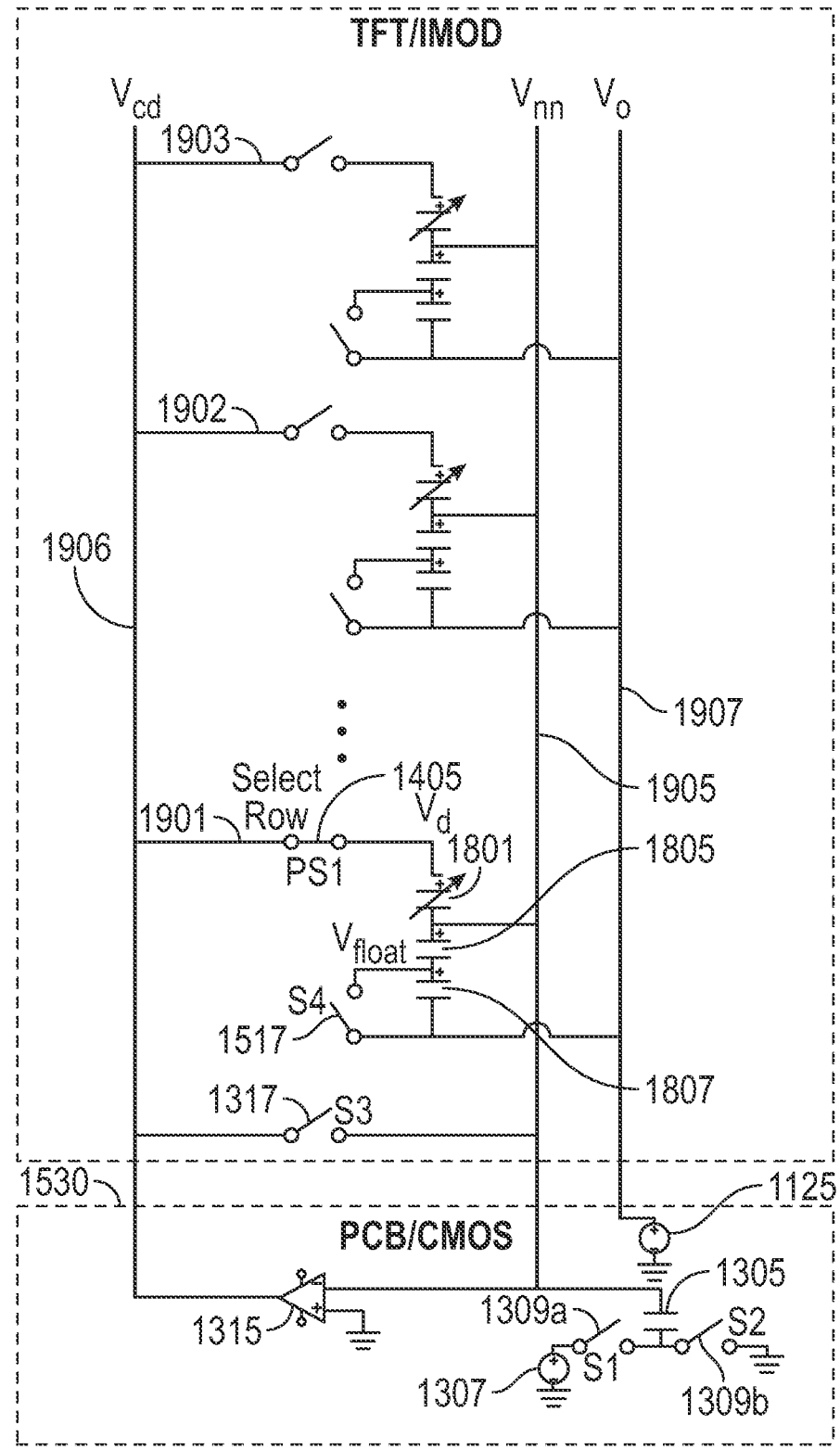
Figure 19D:
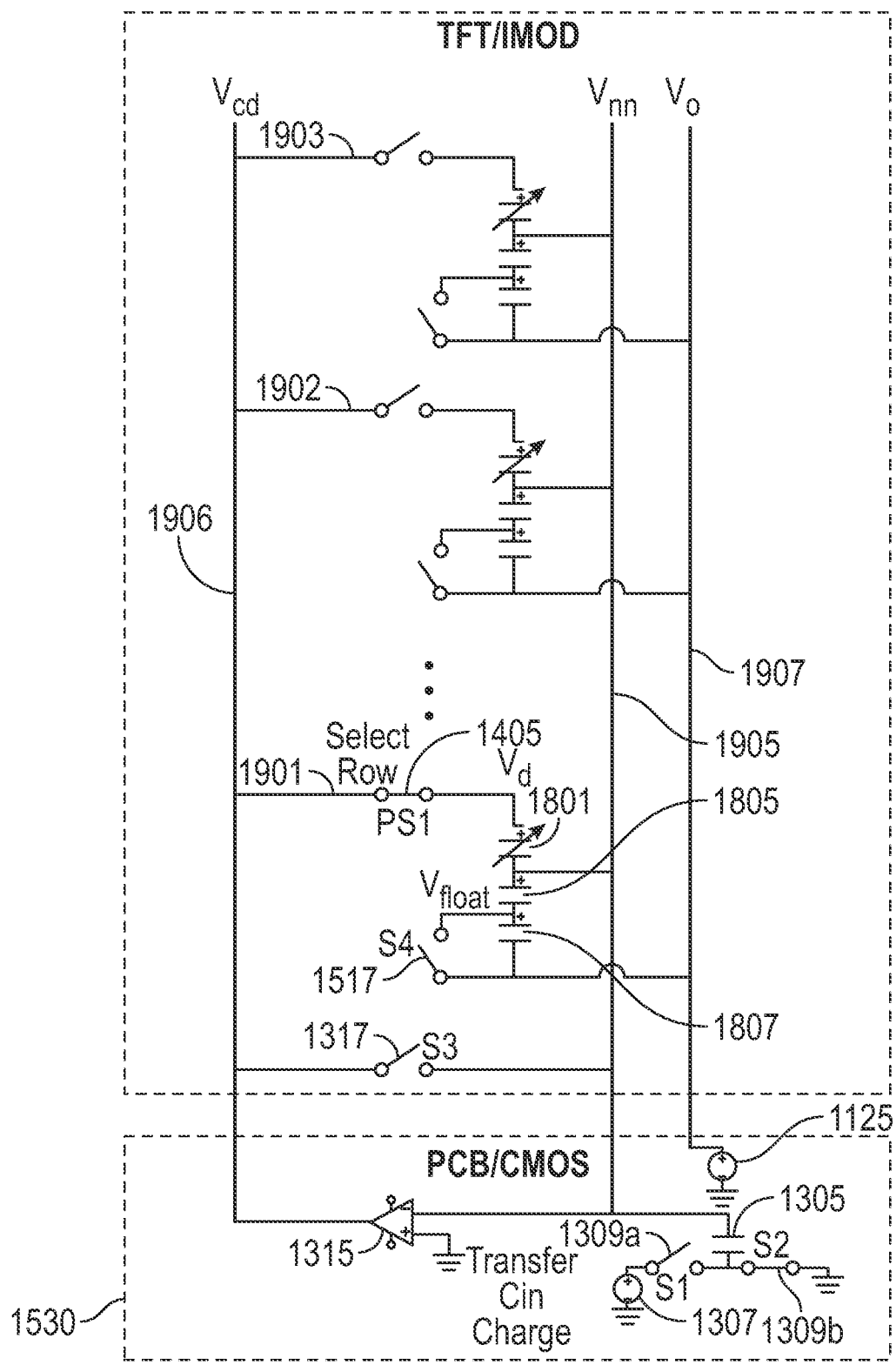
Figure 19E:
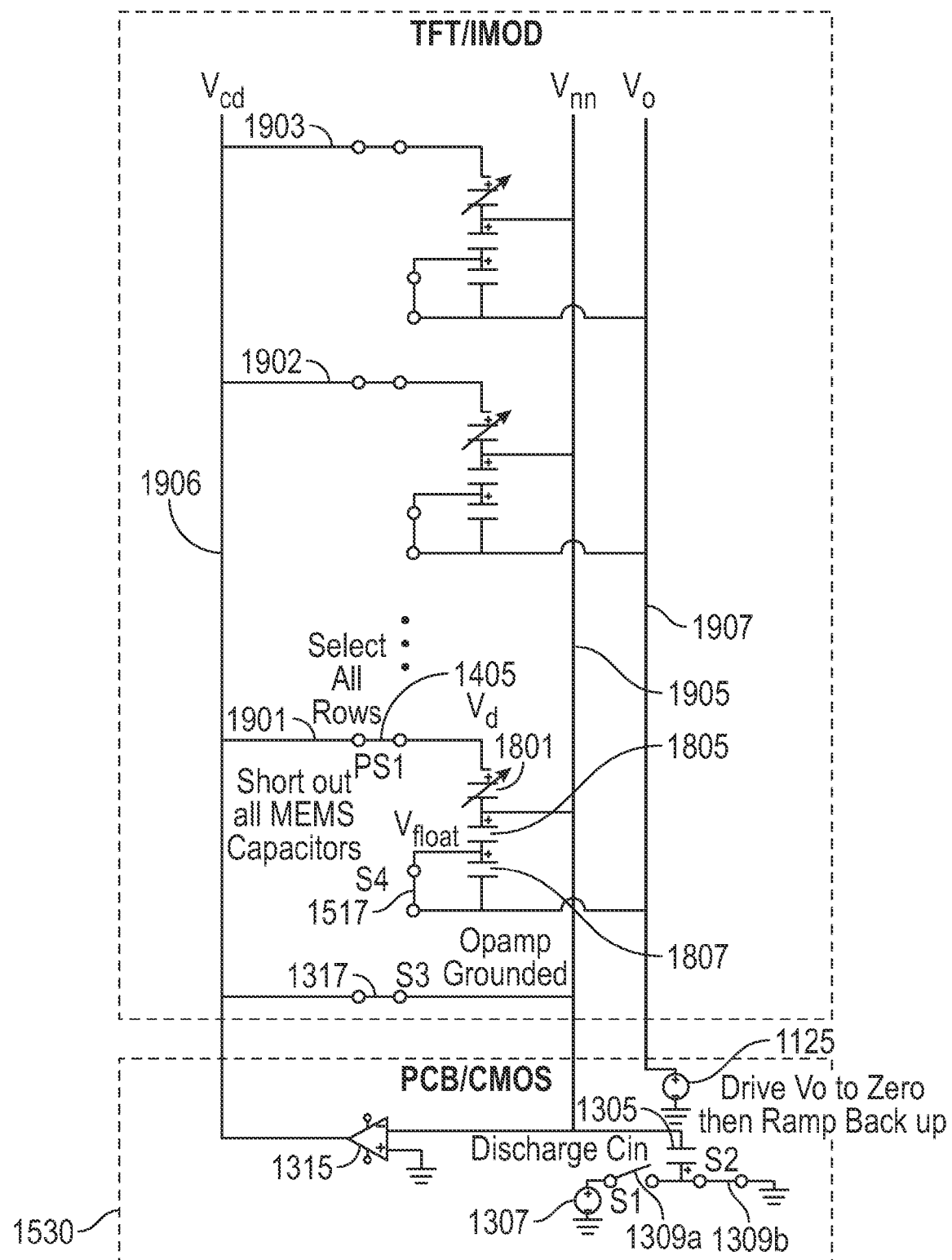

FIGS. 19B-19E illustrate the configuration of the switches 1309a, 1309b and 1317 in the column driver 1530 and the row-select switch 1405 and the global reset switch 1517 at various times, for example during the line times 1550a-1550d discussed above in connection with FIG. 15B. FIG. 19B illustrates the configuration of the switches during the startup phase of the circuit, for example during line time 1550a and/or line time 1550c. During the startup phase, switches 1317 and 1405 are closed to reset the operational amplifier 1315 and the three-terminal EMS device, while the switch 1309a is closed to precharge the input capacitor 1305 to a desired level. Subsequently, the switch 1317 is opened and the row-select switch corresponding to the row including the device to be actuated is closed. In the illustrated implementation, the row-select switch 1405 corresponding to device include in row 1901 is closed. After selecting the row including the device to be actuated, the switch 1309b is closed to transfer the charge from the input capacitor 1305 to the selected device as illustrated in FIG. 19D. Finally, the row-select switch 1405 for all the rows, the global reset switch 1517 in all the rows, the reset switch 1317 and the switch 1309b are closed to discharge the three-terminal devices in all the rows, reset the operational amplifier and discharge the input capacitor 1305 as shown in FIG. 19E. At this time, the bias voltage $V_0$ is also brought down to zero volts and then ramped back up.

Figure 19F:
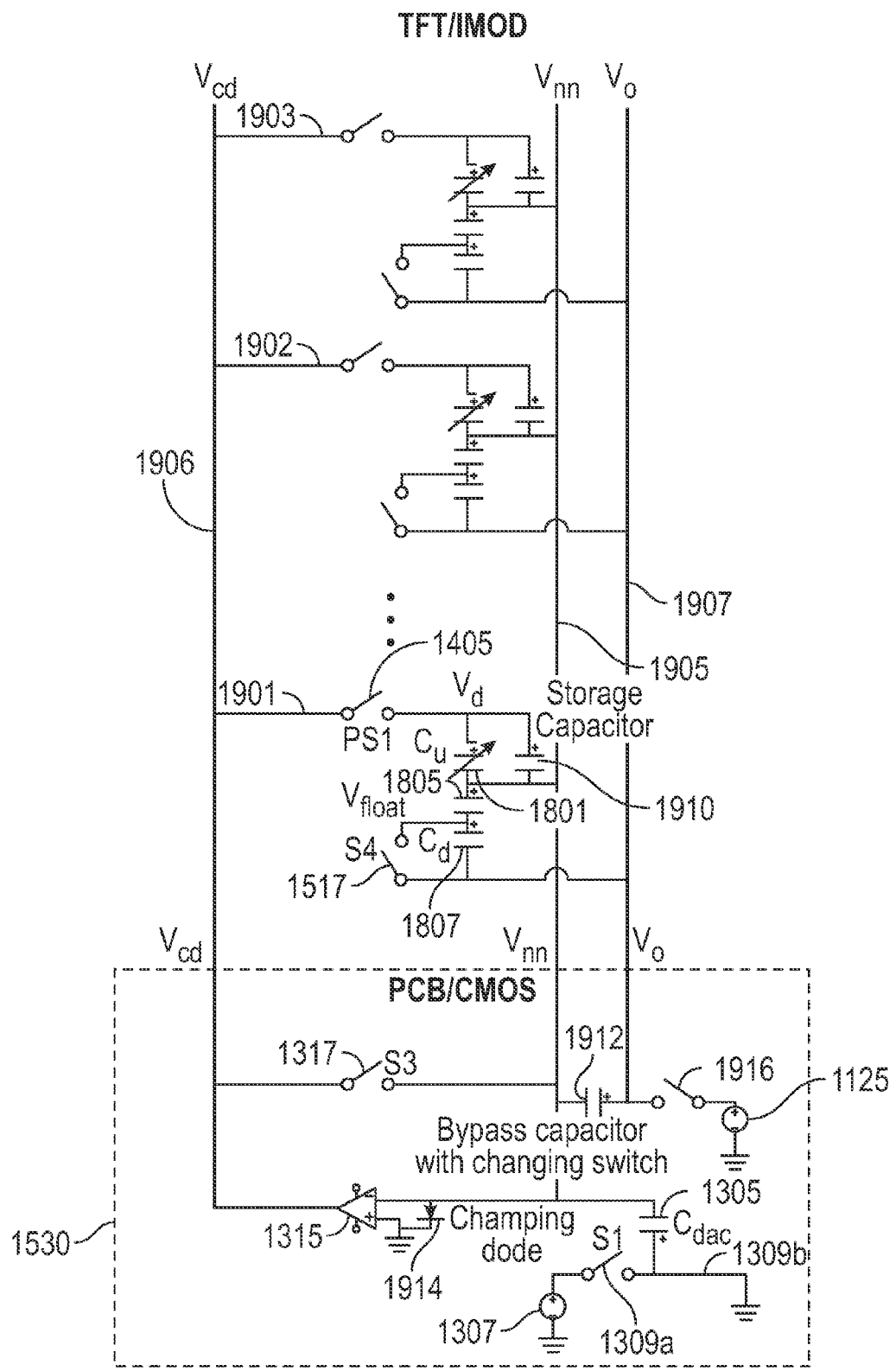

FIG. 19F illustrates an implementation of the layout illustrated in FIG. 19A including a storage capacitor 1910, a bypass capacitor 1912 and a clamping diode 1914. The storage capacitor 1910 is connected in parallel to the variable capacitor 1801 formed between the stationary electrode 1505 on which charges are injected by the charge injection circuit and the movable electrode 1509. The bypass capacitor 1912 is connected between the voltage lines 1905 and 1907. In various implementations, the voltage source 1125 can be connected to the bypass capacitor 1912 via a switch 1916. The clamping diode 1914 is connected between the inverting and non-inverting terminals of the operational amplifier 1315.

There is potential for crosstalk among the various display elements in rows 1901, 1902 and 1903 in the column because of the shared connection to the negative terminal of the operational amplifier 1315 through the common voltage line 1905 which is held at a potential of $V_{nn}$. If the movable electrode 1509 of the selected device does not completely settle down before the subsequent display element in the next row is driven then the variable capacitor 1807 of the selected device will continue to change and inject charges into the $V_{nn}$ node. This injected charge is indistinguishable from the desired charge injected through the input capacitor 1305 and can affect the position of the movable electrode 1509 of the next display element. The bypass capacitor 1912 that is connected in parallel with the variable capacitor 1807 in all the rows can provide sufficient charge to absorb the spurious injected charge before it can affect the charge injection accuracy. In various implementations, the bypass capacitor 1912 has a capacitance larger than the largest total sum of all the variable capacitors 1807 in one column. In various implementations, the bypass capacitor 1912 may be topped up by periodically connecting the bypass capacitor 1912 through a switch 1916 to a voltage source (for example, voltage source 1125) to maintain the voltage difference between voltage line 1905 and the voltage line 1907. In various implementations, the bypass capacitor 1912 may be connected to the voltage source when the operational amplifier 1315 is reset by closing the switch 1317. In various implementations, the bypass capacitor can be considered as an AC short that effectively places the portion of the three-terminal EMS device on which charges are not injected within the feedback loop of the operational amplifier 1315. Thus the total charge transferred to any device is well defined by the switched capacitor circuit and is no longer susceptible to movement of other movable electrodes connected to the shared voltage line 1905.

When the switched capacitor charge injection circuit injects charge into the selected device, the injected charge is divided between the capacitance of the selected device and the parasitic capacitances on the voltage line 1906 connected to the output terminal of the operational amplifier 1315. If the movable electrode 1509 does not reach its equilibrium position before the row select switch 1405 is opened, then the amount of charge that is retained by the device will vary depending on its instantaneous position. In order to minimize this variation, the storage capacitor 1910 is provided in each device. If the storage capacitor 1910 is much larger than the variation in capacitance of the variable capacitor 1801, then the total capacitance variation of the device can be reduced. This can allow for more uniform injection of charge into the device. In various implementations, the storage capacitor 1910 can have a value that is greater than the largest variation in the capacitance of the variable capacitor 1801. In various implementations, the storage capacitor 1910 can have a value that is larger than a smallest value of the capacitance of the variable capacitor 1801. In various implementations, the storage capacitor 1910 can have a value that is smaller than a largest value of the capacitance of the variable capacitor 1801.

An added benefit of reducing the variation in the device capacitance with the position of the movable electrode 1509 is that the peak column voltage $V_d$ can be reduced. Otherwise in implementations requiring a large amount of charge to be injected to actuate the movable electrode 1509 from a low capacitance state to a high capacitance state, the operational amplifier 1315 will need to overdrive the column voltage $V_d$ to inject the desired amount of charge. This overdrive voltage can strain the reliability of the operational amplifier and/or the switches 1309a, 1309b, 1317 and 1405.

When the operational amplifier 1315 is reset, switch 1317 shorts the output and the inverting terminal of the operational amplifier 1315 together. Since the operational amplifier 1315 output voltage can be high, the reset operation can pull up the voltage of the line 1905 for a short time until the operational amplifier 1315 feedback can drive the voltage of line 1905 back down to $V_{nn}$. This voltage spike can be harmful to the operational amplifier 1315 and can cause spurious movement of the movable electrode 1509 which are all connected to that voltage line 1905. The clamping diode 1914 can be useful to limit the spike to one diode drop during the reset operation and will have no effect during all other operating conditions where the voltage $V_{nn}$ is close to ground.

Figure 20A:
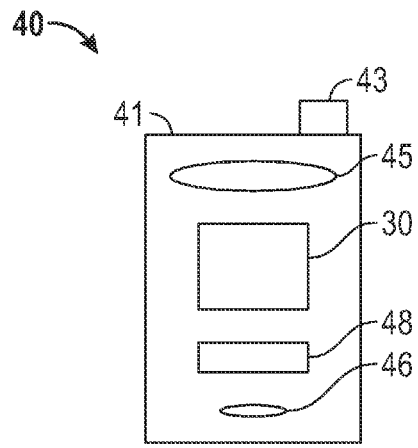
FIGS. 20A and 20B show examples of system block diagrams illustrating a display device that includes a plurality of IMODs.
Figure 20B:
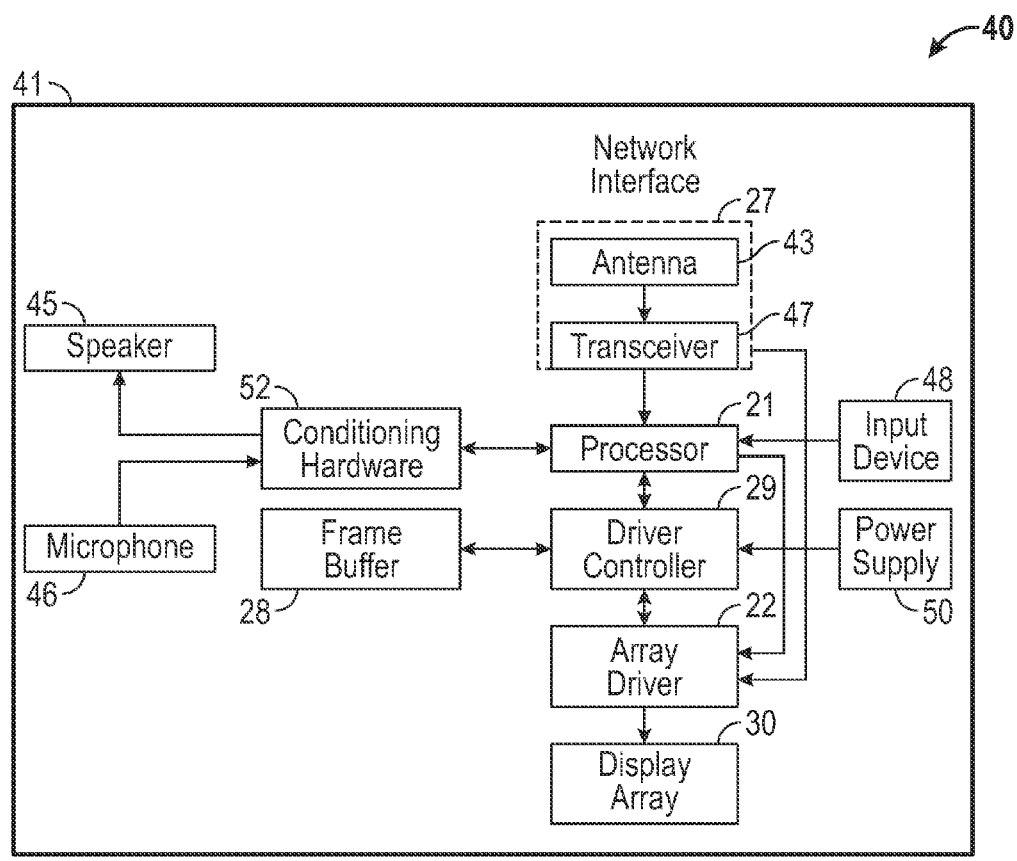

FIGS. 20A and 20B show examples of system block diagrams illustrating a display device that includes a plurality of IMODs. The display device 40 can be, for example, a cellular or mobile telephone. However, the same components of the display device 40 or slight variations thereof are also illustrative of various types of display devices such as televisions, e-readers and portable media players.

The display device 40 includes a housing 41, a display 30, an antenna 43, a speaker 45, an input device 48, and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber, and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an IMOD display, as described herein.

The components of the display device 40 are schematically illustrated in FIG. 20B. The display device 40 includes a housing 41 and can include additional components at least partially enclosed therein. For example, the display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (for example, filter a signal). The conditioning hardware 52 is connected to a speaker 45 and a microphone 46. The processor 21 is also connected to an input device 48 and a driver controller 29. In various implementations, the driver controller 29 can include a charge injection circuit similar to the switched capacitor charge injection circuit 1300, 1400 and 1530 described herein. The driver controller 29 is coupled to a frame buffer 28, and to an array driver 22, which in turn is coupled to a display array 30. A power supply 50 can provide power to all components of the particular display device 40 design.

The network interface 27 includes the antenna 43 and the transceiver 47 so that the display device 40 can communicate with one or more devices over a network. The network interface 27 also may have some processing capabilities to relieve, for example, at least some data processing of the processor 21. The antenna 43 can transmit and receive signals. In some implementations, the antenna 43 transmits and receives RF signals according to the IEEE 16.11 standard, including IEEE 16.11(a), (b), or (g), or the IEEE 802.11 standard, including IEEE 802.11a, b, g or n. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other signals that are used to communicate within a wireless network, such as a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation, and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (for example, an IMOD controller). Additionally, the array driver 22 can be a conventional driver or a bi-stable display driver (for example, an IMOD display driver). Moreover, the display array 30 can be a conventional display array or a bi-stable display array (for example, a display including an array of IMODs). In some implementations, the driver controller 29 can be integrated with the array driver 22. Such an implementation is common in highly integrated systems such as cellular phones, watches and other small-area displays.

In some implementations, the input device 48 can be configured to allow, for example, a user to control the operation of the display device 40. The input device 48 can include a keypad, such as a QWERTY keyboard or a telephone keypad, a button, a switch, a rocker, a touch-sensitive screen, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices. For example, the power supply 50 can be a rechargeable battery, such as a nickel-cadmium battery or a lithium-ion battery. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, that is, one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus, comprising:
   an array of three terminal electromechanical systems (EMS) devices arranged in a plurality of rows and columns, each EMS device including:
   a first stationary electrode layer connected to a first drive line;
   a movable electrode layer connected to a second drive line; and
   a second stationary electrode layer connected to a third drive line, the movable electrode layer disposed between the first and the second stationary electrode layers,
   wherein a portion of the movable electrode layer and the first stationary electrode layer form a first variable capacitor having a first variable capacitance value, and
   wherein a portion of the movable electrode layer and the second stationary electrode layer form a second variable capacitor having a second variable capacitance value;
   a bias voltage circuit having a bias voltage line connected to the third drive line of each of the EMS devices in a column of the array, the bias voltage circuit configured to provide a potential difference between the second stationary electrode layer and the movable electrode layer; and
   a charge injection circuit configured to electrically connect to the first drive line and the second drive line of each of the EMS devices in the column of the array such that the charge injection circuit is electrically connected to the first and second drive line of only one of the EMS devices at any one time to provide a desired charge to the first stationary electrode layer,
   wherein the charge injection circuit includes:
   an operational amplifier having an inverting input line, a non-inverting input line, and an output line, the inverting input line of the operational amplifier being electrically connected to the second drive line of each of the EMS devices in the column;
   a plurality of row-select switches controlled to selectively electrically connect the output line of the operational amplifier to the first drive line of each of the EMS devices in the column such that the output line of the operational amplifier is electrically connected to the first drive line of only one EMS device at any one time; and
   an input capacitor circuit configured to be electrically connected to the inverting line of the operational amplifier or to a voltage circuit for charging the input capacitor circuit to a charge $Q_{in}$,
   wherein the charge injection circuit is controlled to selectively connect the first drive line of each EMS device in the column, for each of the display elements in the column, to the output line of the operational amplifier while a charge from the input capacitor circuit is transferred to the first drive line of the EMS device electrically connected to the charge injection circuit.

2. The apparatus of claim 1, further comprising an operational amplifier grounding switch coupled between the operational amplifier output line and the operational amplifier inverting line.

3. The apparatus of claim 1, wherein the movable electrode layer of each EMS device includes a first conductor proximal to the first stationary electrode layer and a second conductor proximal to the second stationary electrode layer, the first conductor connected to the second drive line and electrically insulated from the second conductor, the first conductor and the first stationary electrode layer forming the first variable capacitor, the second conductor and the second stationary electrode layer forming the second variable capacitor.

4. The apparatus of claim 3, further comprising a movable electrode reset switch configured to connect the second conductor of the movable electrode layer of each EMS devices to an electrical ground.

5. The apparatus of claim 3, further comprising a storage capacitor having a storage capacitance value, the storage capacitor electrically connected between the first stationary electrode layer and the first conductor of the movable electrode layer of each of the EMS devices.

6. The apparatus of claim 5, wherein the storage capacitance has a value that is greater than a smallest value of the first variable capacitance.

7. The apparatus of claim 1, further comprising a bypass capacitor having a bypass capacitance value electrically connected between the inverting line of the operational amplifier and the bias voltage line of the bias voltage circuit.

8. The apparatus of claim 7, wherein the bypass capacitance value is greater than a sum of the second variable capacitance values for all the electromechanical systems devices in the column.

9. The apparatus of claim 7, wherein the bypass capacitor is connected to a charging voltage source through a charging switch.

10. The apparatus of claim 1, further comprising a clamping diode electrically connected between the inverting line and the non-inverting line of the operational amplifier.

11. The apparatus of claim 1, wherein the charge injection circuit is configured to transfer about 10 picocoulombs of charge in about 10 microseconds.

12. The apparatus of claim 1, wherein each of the EMS devices is a display pixel or a portion of a display pixel.

13. The apparatus of claim 12, wherein each of the EMS devices includes an IMOD.

14. The apparatus of claim 12, further comprising:
a display;
a processor that is configured to communicate with the display, the processor being configured to process image data; and
a memory device that is configured to communicate with the processor.

15. The apparatus as recited in claim 14, further comprising:
a driver circuit configured to send at least one signal to the display;
a controller configured to send at least a portion of the image data to the driver circuit; and
an image source module configured to send the image data to the processor, wherein the image source module includes at least one of a receiver, transceiver, and transmitter.

16. The apparatus as recited in claim 14, further comprising:
an input device configured to receive input data and to communicate the input data to the processor.

17. A method of calibrating a three-terminal electromechanical systems (EMS) device in the apparatus of claim 14, the method comprising:
providing a first amount of known charge to the EMS device;
determining a first calculated voltage value for voltage developed across the first stationary electrode and the movable electrode in response to the provided first amount of known charge;
measuring a first voltage value across the first stationary electrode and the movable electrode in response to the provided first amount of known charge;
comparing the first calculated voltage value with the measured first voltage value to obtain a first difference value;
providing a second amount of known charge to the EMS device;
determining a second calculated voltage value for voltage developed across the first stationary electrode and the movable electrode in response to the provided second amount of known charge;
measuring a second voltage value across the first stationary electrode and the movable electrode in response to the provided second amount of known charge;
comparing the second calculated voltage value with the measured second voltage value to obtain a second difference value;
determining calibration information of at least one of a stiffness constant of the movable electrode and a launch bias of the movable electrode based on the first and second difference values; and
storing the calibration information in the memory of the apparatus.

18. An apparatus, comprising:
an array of three terminal electromechanical systems (EMS) devices arranged in a plurality of rows and columns, each EMS device including:
a first stationary means for conducting electricity connected to a first drive line;
a movable means for conducting electricity connected to a second drive line; and
a second stationary means for conducting electricity connected to a third drive line, the movable conducting means disposed between the first and the second stationary conducting means,
wherein a portion of the movable conducting means and the first stationary conducting means form a first variable capacitor having a first variable capacitance value, and
wherein a portion of the movable conducting means and the second stationary conducting means form a second variable capacitor having a second variable capacitance value;
a bias voltage circuit having a bias voltage line connected to the third drive line of each of the EMS devices in a column of the array, the bias voltage circuit configured to provide a potential difference between the second stationary conducting means and the movable conducting means; and
a means for injecting electrical charge configured to electrically connect to the first drive line and the second drive line of each of the EMS devices in the column of the array such that the charge injecting means is electrically connected to the first and second drive line of only one of the EMS devices at any one time to provide a desired charge to the first stationary conducting means, wherein the charge injecting means includes
a means for amplifying having a means for inverting an input, a means for non-inverting an input, and a means for providing an output, the input inverting means being electrically connected to the second drive line of each of the EMS devices in the column;
a plurality of means for selectively electrically connecting the output providing means to the first drive line of each of the EMS devices in the column such that the output providing means is electrically connected to the first drive line of only one EMS device at any one time; and
means for storing capacitance configured to be electrically connected to the input inverting means or to a means for charging the capacitance storing means to a charge $Q_{in}$,
wherein the charge injecting means is controlled to selectively connect the first drive line of each EMS device in the column, for each of the display elements in the column, to the output providing means while a charge from the capacitance storing means is transferred to the first drive line of the EMS device electrically connected to the charge injecting means.

19. The apparatus of claim 18, wherein the first stationary conducting means includes a first stationary electrode layer, the second stationary conducting means includes a second stationary electrode layer, the movable conducting means includes a movable electrode layer, the charge injecting means includes a charge injection circuit, and the selectively electrically connecting means includes a row-select switch.

20. The apparatus of claim 18, further comprising an operational amplifier grounding switch coupled between the output providing means and the input inverting means.

21. The apparatus of claim 18, wherein the movable conducting means of each EMS device includes a first conductor proximal to the first stationary conducting means and a second conductor proximal to the second stationary conducting means, the first conductor connected to the second drive line and electrically insulated from the second conductor, the first conductor and the first stationary conducting means forming the first variable capacitor, the second conductor and the second stationary conducting means forming the second variable capacitor.

22. The apparatus of claim 21, further comprising a storage capacitor having a storage capacitance value, the storage capacitor electrically connected between the first stationary conducting means and the first conductor of the movable conducting means of each of the EMS devices.

23. The apparatus of claim 18, further comprising a bypass capacitor having a bypass capacitance value electrically connected between the input inverting means and the bias voltage line of the bias voltage circuit.

24. The apparatus of claim 18, further comprising a clamping diode electrically connected between the input inverting means and the non-input inverting means.

25. A method of manufacturing, comprising:
providing an array of three terminal electromechanical systems devices arranged in a plurality of rows and columns, each electromechanical systems (EMS) device including:
 a first stationary electrode layer connected to a first drive line;
 a movable electrode layer connected to a second drive line; and
 a second stationary electrode layer connected to a third drive line, the movable electrode layer disposed between the first and the second stationary electrode layers,
 wherein a portion of the movable electrode layer and the first stationary electrode layer form a first variable capacitor having a first variable capacitance value, and
 wherein a portion of the movable electrode layer and the second stationary electrode layer form a second variable capacitor having a second variable capacitance value;
connecting a bias voltage circuit having a bias voltage line connected to the third drive line of each of the EMS devices in a column of the array, the bias voltage circuit configured to provide a potential difference between the second stationary electrode layer and the movable electrode layer; and
selectively coupling a charge injection circuit to the first drive line and the second drive line of only one of the EMS devices in the column of the array at any one time to provide a desired charge to the first stationary electrode layer, wherein the charge injection circuit includes:
 an operational amplifier having an inverting input line, a non-inverting input line, and an output line, the inverting input line of the operational amplifier being electrically connected to the second drive line of each of the EMS devices in the column;
 a plurality of row-select switches controlled to selectively electrically connect the output line of the operational amplifier to the first drive line of each of the EMS devices in the column such that the output line of the operational amplifier is electrically connected to the first drive line of only one EMS device at any one time; and
 an input capacitor circuit configured to be electrically connected to the inverting line of the operation amplifier or to a voltage circuit for charging the input capacitor circuit to a charge $Q_{in}$,
wherein the charge injection circuit is controlled to selectively connect the first drive line of each EMS device in the column, for each of the display elements in the column, to the output line of the operational amplifier while a charge from the input capacitor circuit is transferred to the first drive line of the EMS device electrically connected to the charge injection circuit.

26. The method of claim 25, wherein each of the EMS devices includes an IMOD.

27. The method of claim 25, further comprising connecting a storage capacitor having a storage capacitance value between the first stationary electrode layer and a first conductor of the movable electrode layer of each of the EMS devices, the first conductor being proximal to the first stationary electrode layer.

28. The method of claim 25, further comprising connecting a bypass capacitor having a bypass capacitance value electrically between the inverting line of the operational amplifier and the bias voltage line of the bias voltage circuit.

29. The method of claim 25, further comprising connecting a clamping diode between the inverting line and the non-inverting line of the operational amplifier.

30. A display device manufactured by the method of claim 25.

* * * * *